United States Patent
Naito et al.

(10) Patent No.: US 12,079,437 B2
(45) Date of Patent: Sep. 3, 2024

(54) CAPACITIVE TOUCHSCREEN

(71) Applicant: NISSHA CO., LTD., Kyoto (JP)

(72) Inventors: Yuki Naito, Kyoto (JP); Takeshi Nishimura, Kyoto (JP)

(73) Assignee: NISSHA CO., LTD., Kyoto (JP)

(\*) Notice: Subject to any disclaimer, the term of this patent is extended or adjusted under 35 U.S.C. 154(b) by 0 days.

(21) Appl. No.: 18/281,425

(22) PCT Filed: Feb. 4, 2022

(86) PCT No.: PCT/JP2022/004393
§ 371 (c)(1),
(2) Date: Sep. 11, 2023

(87) PCT Pub. No.: WO2022/196164
PCT Pub. Date: Sep. 22, 2022

(65) Prior Publication Data
US 2024/0168596 A1    May 23, 2024

(30) Foreign Application Priority Data

Mar. 16, 2021    (JP) .................................. 2021-042537

(51) Int. Cl.
*G06F 3/045*    (2006.01)
*G06F 3/044*    (2006.01)

(52) U.S. Cl.
CPC .................................. *G06F 3/0448* (2019.05)

(58) Field of Classification Search
CPC ......... G06F 2203/04112; G06F 3/0445; G06F 3/0446; H03K 17/9622
See application file for complete search history.

(56) References Cited

U.S. PATENT DOCUMENTS

| | | | |
|---|---|---|---|
| 8,603,611 B2 | 12/2013 | Wakabayashi et al. | |
| 8,717,332 B2 | 5/2014 | Kono et al. | |
| 2004/0071889 A1* | 4/2004 | Asakawa | G02B 1/115 |
| | | | 427/402 |

(Continued)

FOREIGN PATENT DOCUMENTS

| JP | 2010039537 A | 2/2010 |
|---|---|---|
| JP | 2012032955 A | 2/2012 |

(Continued)

OTHER PUBLICATIONS

International search report PCT/JP2022/004393 dated Apr. 5, 2022 (pp. 1-6).

(Continued)

*Primary Examiner* — Insa Sadio
(74) *Attorney, Agent, or Firm* — Millen, White, Zelano & Branigan P.C.; William F. Nixon

(57) ABSTRACT

A capacitive touchscreen has higher touch sensitivity. In a capacitive touchscreen, a first electrode pattern is located on a first surface of a first substrate and includes a plurality of first split electrodes. A first dummy electrode pattern is located on the first surface of the first substrate and includes a plurality of first dummy electrodes. A second electrode pattern is located on a second surface of the first substrate and includes a plurality of second split electrodes. A second dummy electrode pattern is located on the second surface of a second substrate and includes a plurality of second dummy electrodes.

19 Claims, 20 Drawing Sheets

(56) References Cited

U.S. PATENT DOCUMENTS

2005/0083307 A1\* 4/2005 Aufderheide ......... G06F 3/0443
  345/173
2012/0098782 A1   4/2012 Nam

FOREIGN PATENT DOCUMENTS

| JP | 2012079238 A | 4/2012 |
| JP | 2019003505 A | 1/2019 |
| WO | 2006126604 A1 | 11/2006 |

OTHER PUBLICATIONS

English translation of Office Action in corresponding JP2021-042537 dated Jan. 11, 2023 (pp. 1-4).

\* cited by examiner

CAPACITIVE TOUCHSCREEN

TECHNICAL FIELD

The present invention relates to a capacitive touchscreen.

BACKGROUND

A capacitive touchscreen commonly includes multiple first transparent electrodes and multiple second transparent electrodes facing each other. The transparent electrodes are on both sides of one transparent film or on one side of each of two transparent films. Known materials for the transparent electrodes include tin oxide ($SnO_2$), indium tin oxide (ITO), and zinc oxide (ZnO). Materials for the transparent electrodes also include metal nanowires such as silver nanowires (AgNWs).

Known touchscreens may include dummy electrodes between multiple transparent electrodes of the same type arranged in the planar direction (refer to Patent Literature 1). The dummy electrodes reduce the difference in light transmittance between a portion with the transparent electrodes and other portions. The transparent electrodes are thus less visible. The dummy electrodes are typically split into multiple fine areas to reduce parasitic capacitance.

CITATION LIST

Patent Literature

Patent Literature 1: Japanese Unexamined Patent Application Publication No. 2008-129708

BRIEF SUMMARY

Technical Problem

A typical capacitive touchscreen includes first transparent electrodes and second transparent electrodes including sensing electrodes. Each of these sensing electrodes includes multiple split electrodes, between which dummy patterns are arranged. The capacitive touchscreen also includes driving electrodes that are wide and solid.

Large screens with faster touch detection speed are awaited. Such a screen with the above structure includes the sensing electrodes and the driving electrodes that largely overlap each other and thus may not have high touch sensitivity.

One or more aspects of the present disclosure are directed to a capacitive touchscreen with higher touch sensitivity.

Solution to Problem

In response to the above issue, aspects of the present invention will now be described. Any of these aspects may be combined as appropriate.

A capacitive touchscreen according to an aspect of the present invention includes a transparent insulating substrate, a first electrode pattern, a first dummy electrode pattern, a second electrode pattern, and a second dummy electrode pattern.

The first electrode pattern is located on a first surface of the transparent insulating substrate and includes a plurality of first split electrodes.

The first dummy electrode pattern is located in an area with no first electrode on the first surface of the transparent insulating substrate and includes a plurality of first dummy electrodes.

The second electrode pattern is located on a second surface of the transparent insulating substrate and includes a plurality of second split electrodes.

The second dummy electrode pattern is located in an area with no second electrode pattern on the second surface of the transparent insulating substrate and includes a plurality of second dummy electrodes.

In this touchscreen, each of the first electrode pattern and the second electrode pattern includes the split electrodes. The first and second electrode patterns overlap each other in a smaller area than in a structure with a known touchscreen including solid electrodes in one of the patterns. The touchscreen can thus have higher touch sensitivity.

At least one first dummy electrode of the plurality of first dummy electrodes may include a slit. At least one second dummy electrode of the plurality of second dummy electrodes may include a slit.

The slits in this touchscreen increase the uniformity of the pattern distribution in the plane and reduce pattern visibility in, for example, portions in which the dummy electrodes overlap the electrode pattern. The first dummy electrodes are on the first surface of the substrate, and the second dummy electrodes are on the second surface of the substrate in this touchscreen. This structure thus effectively reduces pattern visibility using the first dummy electrode pattern and the second dummy electrode pattern.

The slit may extend inward from an outer edge of the at least one first dummy electrode or the at least one second dummy electrode in a portion in which the at least one first dummy electrode or the at least one second dummy electrode partially overlaps the second electrode pattern or the first electrode pattern.

The slits in this touchscreen increase the uniformity of the pattern distribution in the plane and reduce pattern visibility in, for example, portions in which the first dummy electrodes partially overlap the second electrode pattern.

The slit may split the at least one first dummy electrode or the at least one second dummy electrode into a plurality of parts in a portion in which the first dummy electrode pattern or the second dummy electrode pattern fully overlaps the second electrode pattern or the first electrode pattern.

The slits in this touchscreen increase the uniformity of the pattern distribution in the plane and reduce pattern visibility in, for example, portions in which the first dummy electrodes fully overlap the second electrode pattern.

One of the plurality of first dummy electrodes may overlap second dummy electrodes of the plurality of second dummy electrodes or one of the plurality of second dummy electrodes may overlap first dummy electrodes of the plurality of first dummy electrodes in a portion in which the plurality of first dummy electrodes and the plurality of second dummy electrodes overlap each other.

The touchscreen with the above structure includes second dummy electrodes overlapping one first dummy electrode. The dummy electrodes increase the uniformity of the pattern distribution in the plane and reduce pattern visibility.

Each of the first electrode pattern and the second electrode pattern may include a plurality of electrode slits extending in an electrode extending direction in a portion in which the first electrode pattern and the second electrode pattern overlap each other.

The plurality of electrode slits in this touchscreen increase the uniformity of the pattern distribution in the plane and reduce pattern visibility in portions in which the first electrode pattern and the second electrode pattern overlap each other. Both the electrode patterns in this touchscreen include the split electrodes. This structure thus effectively reduces pattern visibility using the electrode patterns on both ends in the stacking direction.

The first electrode pattern, the second electrode pattern, the plurality of electrode slits, the first dummy electrode pattern, the second dummy electrode pattern, and the slit may split a portion in which the first electrode pattern overlaps the second electrode pattern or the second dummy electrode pattern and a portion in which the second electrode pattern overlaps the first electrode pattern or the first dummy electrode pattern into a plurality of identical shapes defined by slit portions.

A portion in which the two electrode patterns overlap each other in the touchscreen is split into the plurality of identical shapes defined by the slit portions. This reduces pattern visibility.

Each of the plurality of first dummy electrodes may have a width x, where x is a width of each of the plurality of first split electrodes in the first electrode pattern.

A distance between the plurality of first split electrodes in the first electrode pattern may be a sum of integer multiples of x and y, where y is a width of a gap between a first split electrode of the plurality of first split electrodes in the first electrode pattern and a first dummy electrode of the plurality of first dummy electrodes and is a width of a gap between the plurality of first dummy electrodes.

Each of the plurality of second split electrodes in the second electrode pattern may have a width z, where z is $nx+(n-1)y$, where n is a positive integer.

Each of the plurality of second dummy electrodes may have the width x.

A distance between the plurality of second split electrodes in the second electrode pattern may be a sum of integer multiples of x and y. The plurality of identical shapes defined by the slit portions may be square.

A portion in which the two electrode patterns overlap each other in the touchscreen is split into a plurality of squares defined by the slit portions. This reduces pattern visibility.

Advantageous Effects

The capacitive touchscreen according to the above aspects of the present invention reduces pattern visibility.

DETAILED DESCRIPTION

1. First Embodiment (1) Basic Structure of Touchscreen

Figure 1:
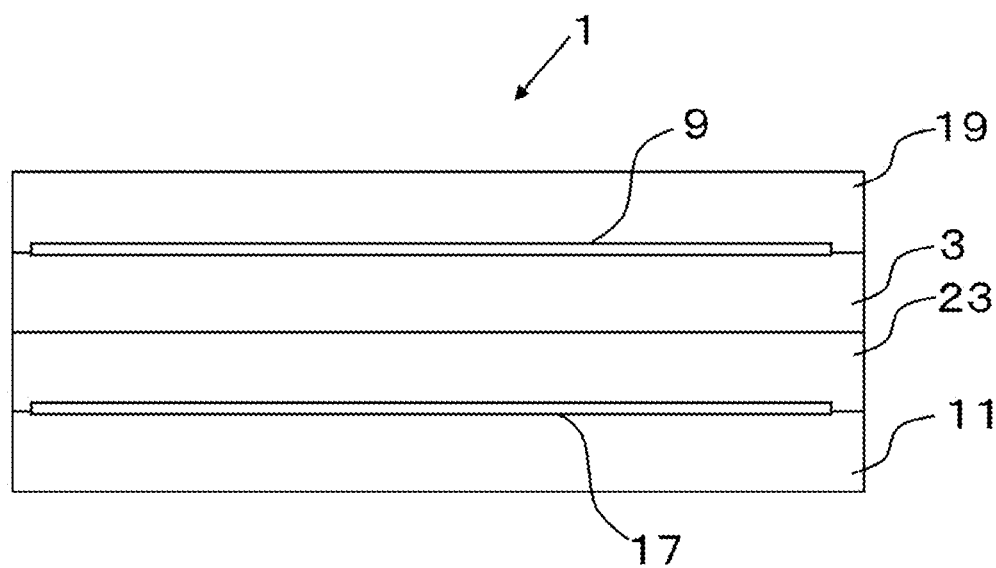
FIG. 1 is a schematic cross-sectional view of a touchscreen according to a first embodiment.
Figure 2:
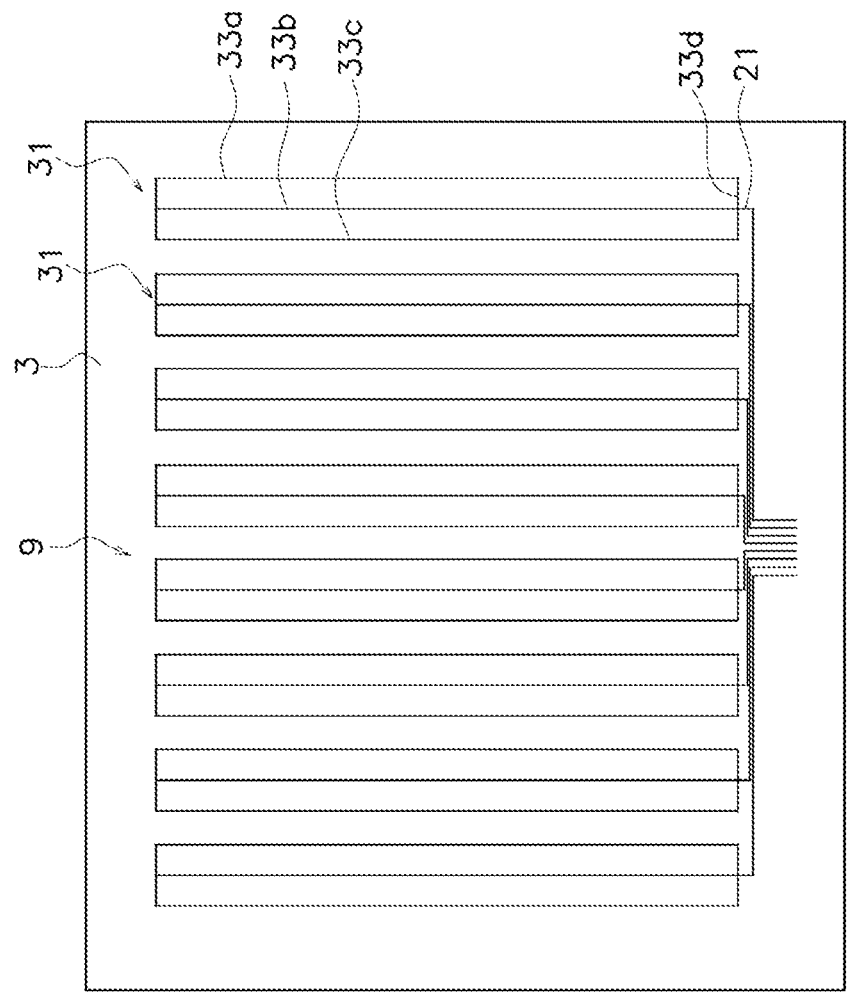
FIG. 2 is a schematic plan view of a first electrode pattern.
Figure 3:
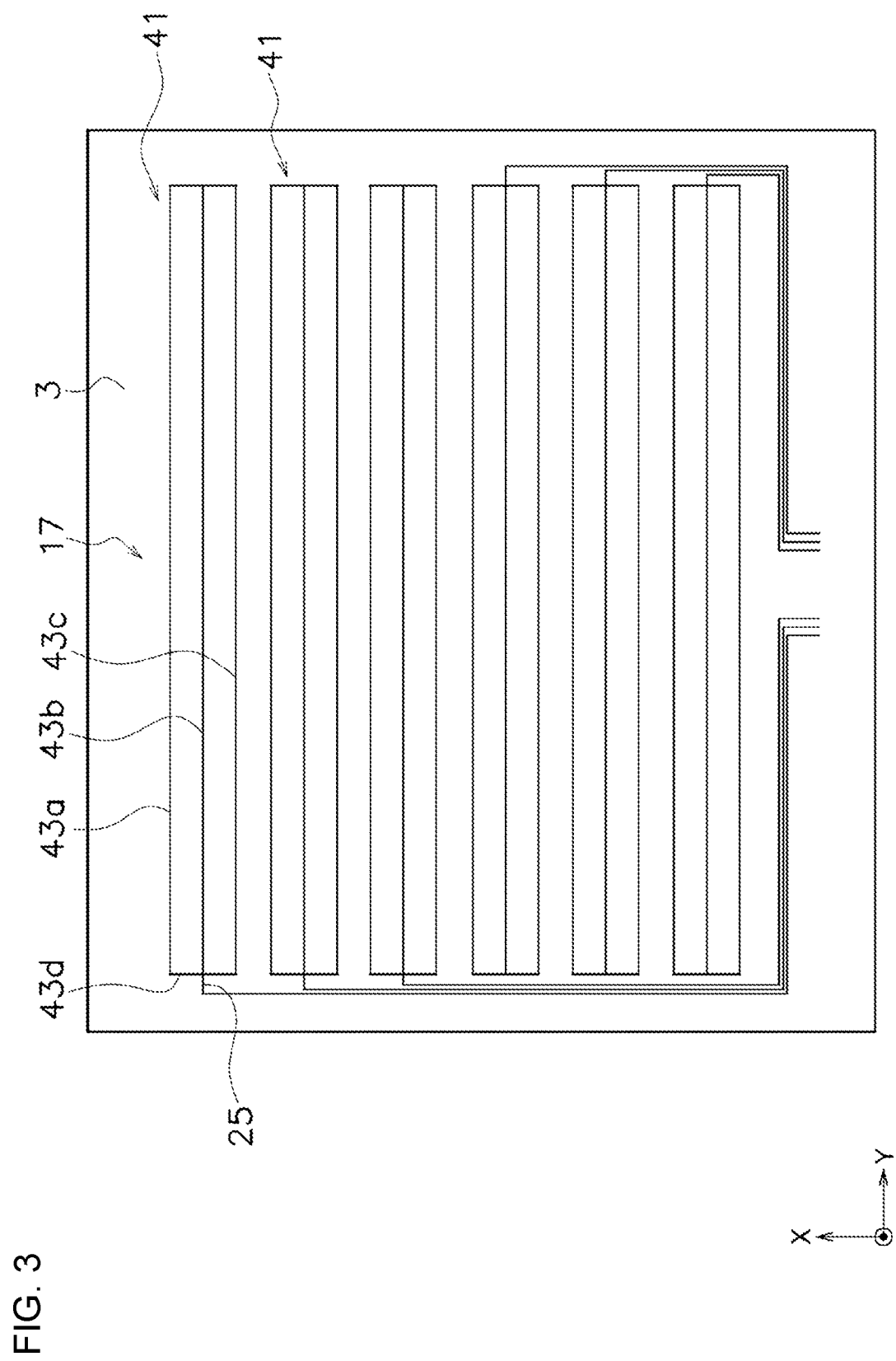
FIG. 3 is a schematic plan view of a second electrode pattern.

A touchscreen 1 according to a first embodiment will now be described with reference to FIGS. 1 to 3. FIG. 1 is a schematic cross-sectional view of the touchscreen according to the first embodiment. FIG. 2 is a schematic plan view of a first electrode pattern. FIG. 3 is a schematic plan view of a second electrode pattern.

The touchscreen 1 includes a strip electrode pattern and a single-layer substrate as its basic structure.

The touchscreen 1 can be used as a touch input device in electronic devices such as multifunctional mobile phones (smartphones) and portable game consoles. The touchscreen 1 is overlaid with a display device including, for example, a liquid crystal display panel or an organic electroluminescent (EL) display panel when used in the electronic devices.

The touchscreen 1 includes a substrate 3 as a single transparent insulating substrate. The touchscreen 1 includes a first electrode pattern 9. The first electrode pattern 9 is on a first surface 3a of the substrate 3.

The touchscreen 1 includes a second electrode pattern 17. The second electrode pattern 17 is on a second surface 3b of the substrate 3.

The touchscreen 1 further includes a first protective layer 19, first routing wires 21, a second protective layer 23, and second routing wires 25.

The first electrode pattern 9, the first protective layer 19, and the first routing wires 21 (FIG. 2) are on the first surface 3a of the substrate 3. The second electrode pattern 17, the second protective layer 23, and the second routing wires 25 (FIG. 3) are on the second surface 3b of the substrate 3.

The substrate 3 is a base for the first electrode pattern 9. The substrate 3 may be formed from a material that is, for example, highly transparent, flexible, and insulating. Examples of the material include general-purpose resins such as polyethylene terephthalate and an acrylic resin, general-purpose engineering resins such as a polyacetal resin and a polycarbonate resin, and super engineering resins such as a polysulfone resin and a polyphenylene sulfide resin. Examples of the material may further include a cycloolefin resin. The substrate 3 may have a thickness of, for example, 25 to 100 μm. The substrate 3 may be formed from a material such as a glass substrate. The substrate 3 may be a single layer or multiple layers of a resin film or may be a coated resin layer.

The first electrode pattern 9 includes multiple first electrodes 31 as shown in FIG. 2. The multiple first electrodes 31 extending in X-direction are multiple strips of electrodes that are aligned in Y-direction. Each first electrode 31 includes three first split electrodes 33a, 33b, and 33c that are parallel to one another and a terminal 33d connecting one end of each electrode.

The first protective layer 19 covers the first electrode pattern 9 and functions as an insulating corrosion inhibiting layer that protects the material for the first electrode pattern 9. The first protective layer 19 is mainly formed from a common photosensitive resin composition. The protective layer may also function as an adhesive layer.

The first electrode pattern 9 is a transparent conductive film. More specifically, the first electrode pattern 9 may be formed from, for example, metal oxide such as tin oxide, indium oxide, antimony oxide, zinc oxide, cadmium oxide, and indium tin oxide (ITO), silver nanowires, carbon nanotubes, poly(3,4-ethylenedioxythiophene) (PEDOT), graphene, metal mesh, or a conductive polymer.

To reduce pattern visibility, the structure according to one or more embodiments of the present invention may specifically use PEDOT, carbon nanotubes, or silver nanowires.

Each first electrode 31 is connected to the first routing wire 21. Each first routing wire 21 is mainly formed from conductive ink containing conductive particles of metal such as gold, silver, copper, nickel, and palladium or carbon. The conductive ink may contain conductive particles of a single material or a combination of multiple materials.

The second protective layer 23 and the second routing wires 25 have the same structures as the first protective layer 19 and the first routing wires 21 except their specific structures associated with the shape and arrangement of the second electrode pattern 17.

The second electrode pattern 17 includes multiple second electrodes 41 as shown in FIG. 3. The multiple second electrodes 41 extending in Y-direction are multiple strips of electrodes that are aligned in X-direction parallel to each other. Each second electrode 41 includes three second split electrodes 43a, 43b, and 43c that are parallel to one another and a terminal 43d connecting one end of each electrode.

Each second electrode 41 is connected to the second routing wire 25.

Both the first electrode pattern 9 and the second electrode pattern 17 in the present embodiment include split electrodes. The first electrode pattern 9 and the second electrode pattern 17 overlap each other in a smaller area than in a structure with a known touchscreen including solid electrodes in one of the patterns. The touchscreen 1 can thus have higher touch sensitivity.

The first routing wires 21 are located at the periphery of the first surface 3a of the substrate 3 in a plan view.

The second routing wires 25 are located at the periphery of the second surface 3b of the substrate 3 in a plan view.

The first routing wires 21 and the second routing wires 25 are connected to a controller (not shown).

The first electrode pattern 9 includes sensing electrodes. The second electrode pattern 17 includes driving electrodes. The controller scans the second electrode pattern 17 by sequentially applying a predetermined voltage to the second routing wires 25. The controller then controls the first electrode pattern 9 to have a predetermined potential (bias potential) at a predetermined timing with the first routing wires 21.

When, for example, a finger of a user comes in contact with a display surface, an electric signal (hereafter, a sensing signal) corresponding to a change in an electric field between the first electrode pattern 9 and the second electrode pattern 17 is input into the controller with the first routing wires 21. The controller can detect a touch operation performed by the user and a touch position.

(2) Dummy Electrode Pattern

Figure 4:
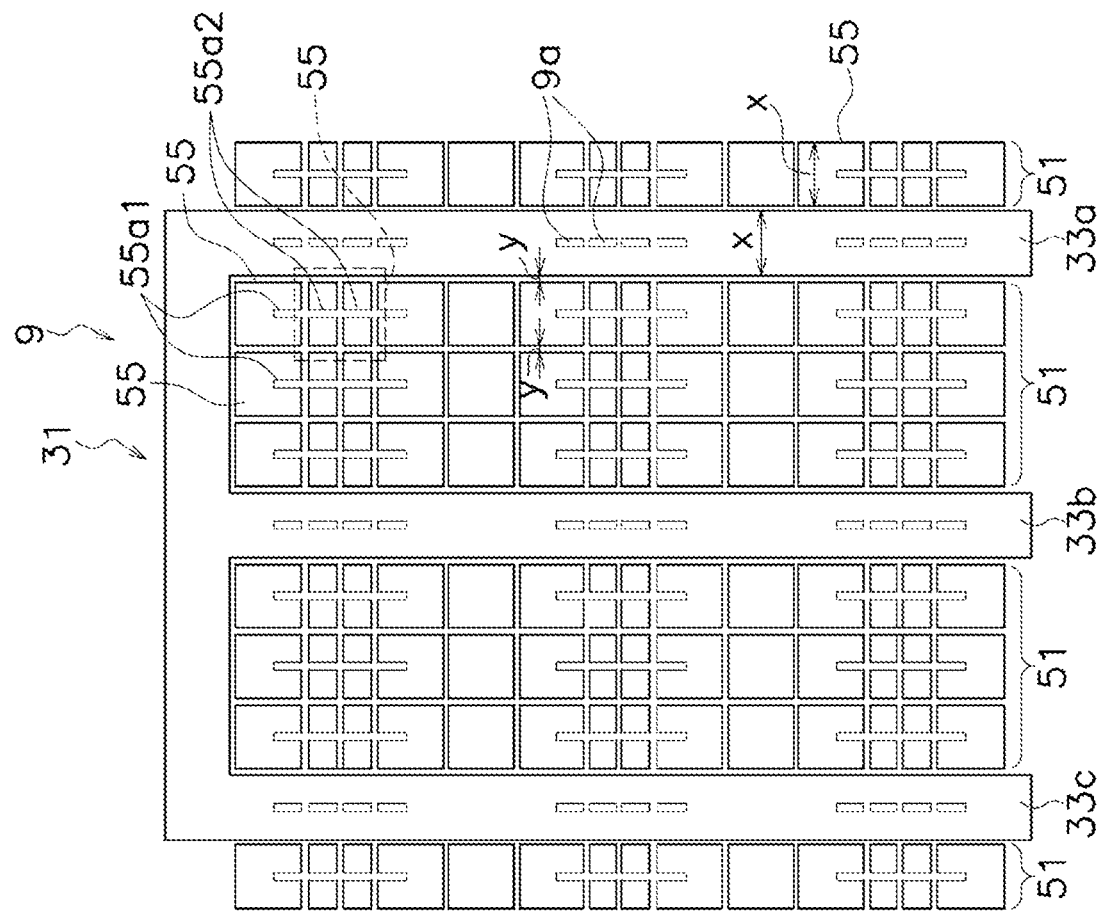
FIG. 4 is a schematic partial plan view of the first electrode pattern and first dummy electrode patterns.
Figure 5:
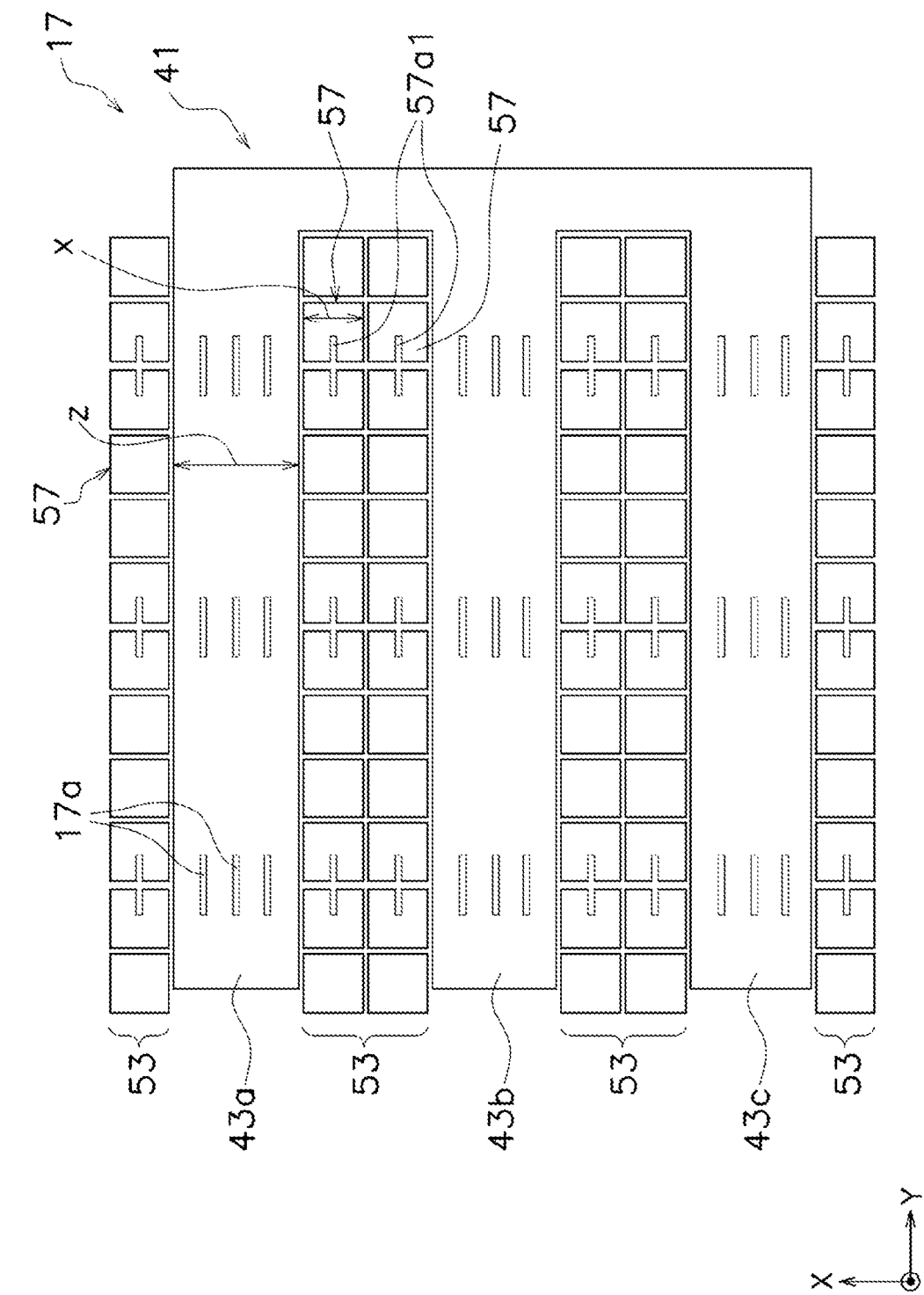
FIG. 5 is a schematic partial plan view of the second electrode pattern and second dummy electrode patterns.

First dummy electrode patterns 51 and second dummy electrode patterns 53 will now be described with reference to FIGS. 4 and 5. FIG. 4 is a schematic partial plan view of the first electrode pattern and the first dummy electrode patterns. FIG. 5 is a schematic partial plan view of the second electrode pattern and the second dummy electrode patterns.

As shown in FIG. 4, the first dummy electrode patterns 51 are in areas with no first electrode pattern 9 on the first surface 3a of the substrate 3. The first dummy electrode patterns 51 electrically insulated from the first electrode pattern 9 each include first dummy electrodes 55 as small islands. The first surface 3a of the substrate 3 is fully covered by the first electrode pattern 9 and the first dummy electrode patterns 51. The first dummy electrode patterns 51 reduce the difference in light transmittance and the visibility of the electrodes from outside. This structure can thus reduce the pattern visibility of the first electrode pattern 9. The first dummy electrode patterns 51 may be formed from the same material as the first electrode pattern 9 to reduce pattern visibility.

The first dummy electrodes 55 are square. In this embodiment, being square refers to having a shape with four sides with substantially the same length.

As shown in FIG. 5, the second dummy electrode patterns 53 are in areas with no second electrode pattern 17 on the second surface 3b of the substrate 3. The second dummy electrode patterns 53 electrically insulated from the second electrode pattern 17 each include multiple second dummy electrodes 57. The second surface 3b of the substrate 3 is fully covered by the second electrode pattern 17 and the second dummy electrode patterns 53. This structure can thus reduce the pattern visibility of the second electrode pattern 17. The second dummy electrode patterns 53 may be formed from the same material as the second electrode pattern 17 to reduce pattern visibility.

The second dummy electrodes 57 are square. The second dummy electrodes 57 have the same dimensions as the first dummy electrodes 55.

(3) Reducing Pattern Visibility with Electrode Pattern and Dummy Electrode Pattern (3-1) Slits in Dummy Electrodes As shown in FIG. 4, the first dummy electrodes 55 in each first dummy electrode pattern 51 include three types of electrodes, electrodes without slits, electrodes with first slits 55a1, and electrodes with second slits 55a2. As shown in FIG. 5, the second dummy electrodes 57 in each second dummy electrode pattern 53 include two types of electrodes, electrodes without slits and electrodes with third slits 57a1.

The first slits 55a1 extend in X-direction. The second slits 55a2 extend to split the first dummy electrodes 55 into multiple parts. More specifically, the second slits 55a2 each extend crosswise from the center to the edges of the first dummy electrode 55.

The slits in the dummy electrodes increase the uniformity of the pattern distribution in the plane and reduce pattern visibility in, for example, portions in which the electrode patterns overlap the dummy electrode patterns. The touchscreen 1 includes the first dummy electrodes 55 on the first surface 3a of the substrate 3 and the second dummy electrodes 57 on the second surface 3b of the substrate 3. This structure thus effectively reduces pattern visibility using both the first dummy electrodes 55 and the second dummy electrodes 57.

(3-2) Slits in Dummy Electrodes in First Embodiment

Figure 6:
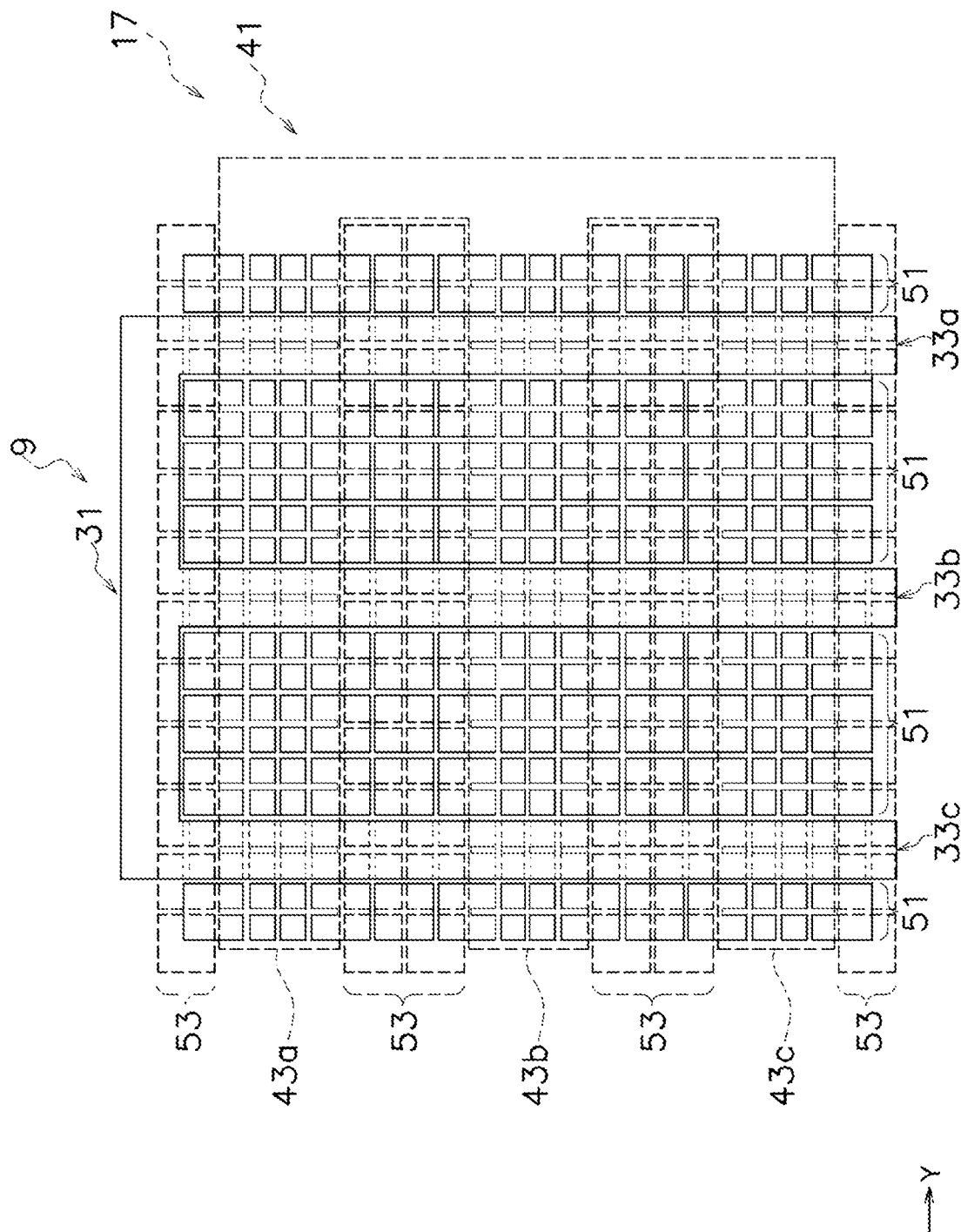
FIG. 6 is a schematic partial plan view of the touchscreen viewed from above, showing an overall pattern resulting from superimposing FIGS. 4 and 5.
Figure 7:
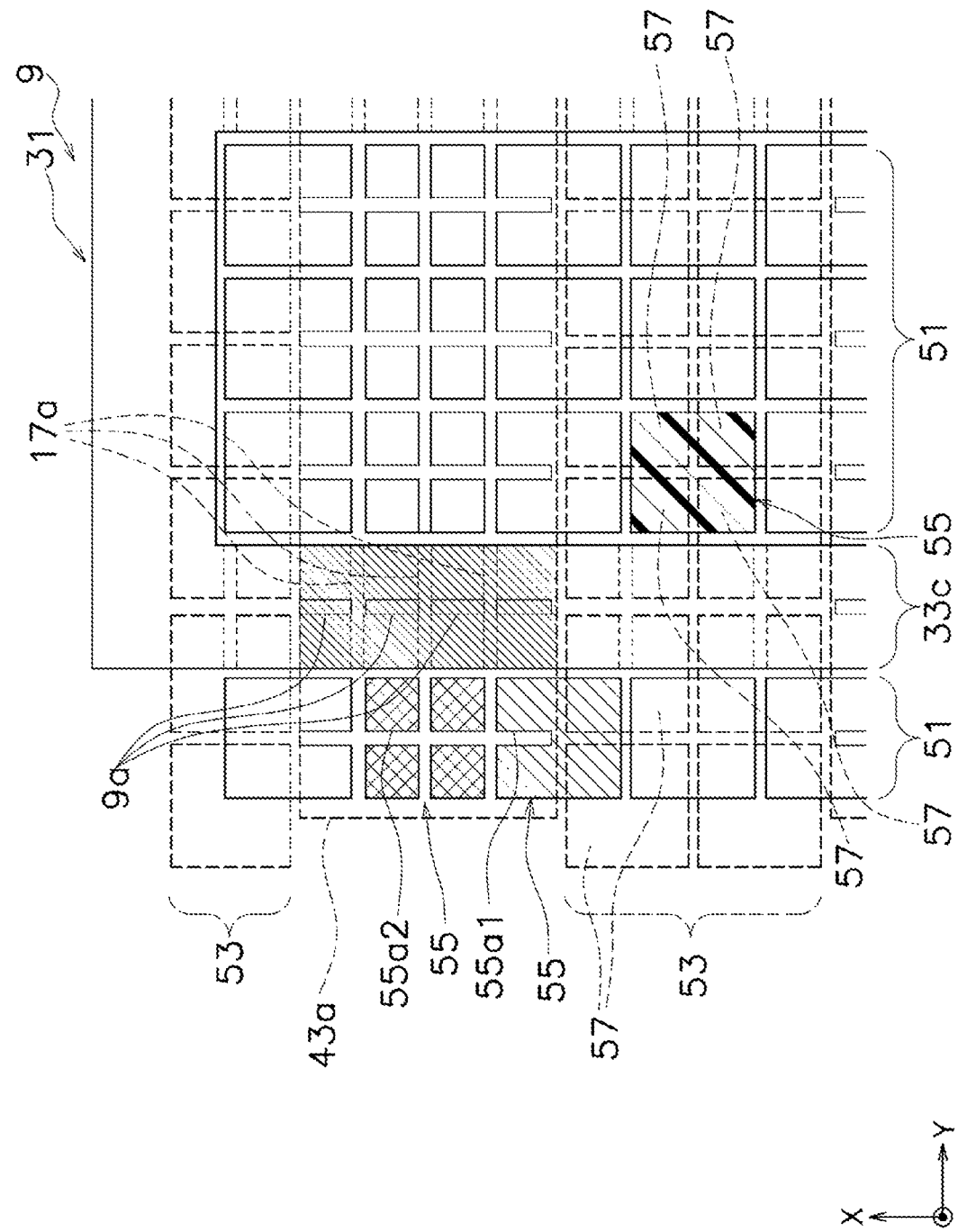
FIG. 7 is a partially enlarged view of FIG. 6.

A pattern described with reference to FIGS. 6 and 7 results from the first electrode pattern 9 and the first dummy electrode patterns 51 overlapping the second electrode pattern 17 and the second dummy electrode patterns 53. FIG. 6 is a schematic partial plan view of the touchscreen viewed from above, showing an overall pattern resulting from superimposing FIGS. 4 and 5. FIG. 7 is a partially enlarged view of FIG. 6. In FIGS. 6 and 7, the solid lines indicate the first electrode pattern 9 and the first dummy electrode patterns 51, and the broken lines indicate the second electrode pattern 17 and the second dummy electrode patterns 53.

As shown in FIG. 7, in a portion in which one of the first dummy electrodes 55 partially overlaps the second electrode pattern 17, the first slit 55a1 extends inward from the outer edge of the first dummy electrode 55. As shown in FIG. 5, in a portion in which one of the second dummy electrodes 57 partially overlaps the first electrode pattern 9, the third slit 57a1 extends inward from the outer edge of the second dummy electrode 57. More specifically, the slits each extend linearly from the center to the edge of the dummy electrode and have a width equal to the distance between the electrode pattern and the dummy electrode pattern. The first slit 55a1 increases the uniformity of the pattern distribution in the plane and reduces pattern visibility in, for example, a portion in which the first dummy electrode 55 (simply hatched) partially overlaps the second electrode pattern 17 as shown in FIG. 7. The above structure is also achievable with a combination of the second dummy electrodes 57 and the first electrode pattern 9. The substrate 3 includes the first dummy electrodes 55 on the first surface 3a and the second dummy electrodes 57 on the second surface 3b. This structure thus effectively reduces pattern visibility using both the first dummy electrodes 55 and the second dummy electrodes 57.

More specifically, the first dummy electrode 55 simply hatched in FIG. 7 extends across the second split electrode 43a and two second dummy electrodes 57. A gap between the first slit 55a1 and the two second dummy electrodes 57 is a vertical slit in the figure, and a gap between the second split electrode 43a and the two second dummy electrodes 57 is a horizontal slit. The slits define a pattern of small squares.

(3-3) Slits in Dummy Electrodes in Second Embodiment

As shown in FIG. 4, in a portion in which one of the first dummy electrodes 55 fully overlaps the second electrode pattern 17, the second slit 55a2 extends to split the first dummy electrode 55 into multiple parts. More specifically, the slit extends crosswise from the center to the edges of the first dummy electrode 55 and has a width equal to the distance between the electrode pattern and the dummy electrode pattern.

The second slit 55a2 increases the uniformity of the pattern distribution in the plane and reduces pattern visibility in, for example, a portion in which the first dummy electrode 55 (cross-hatched) fully overlap the second electrode pattern 55 as shown in FIG. 7. The above structure is also achievable with a combination of the second dummy electrodes 57 and the first electrode pattern 9. This structure effectively reduces pattern visibility using both the first dummy electrodes 55 and the second dummy electrodes 57.

More specifically, the first dummy electrode 55 cross-hatched in FIG. 7 overlaps the second split electrode 43a. The second slit 55a2 being a cross-shaped slit defines a pattern of small squares.

(3-4) Portion in Which First Dummy Electrode Pattern and Second Dummy Electrode Pattern Overlap Each Other in First Embodiment One of the first dummy electrodes 55 overlaps multiple second dummy electrodes 57 in a portion in which the first dummy electrode pattern 51 and the second dummy electrode pattern 53 overlap each other. One of the second dummy electrodes 57 overlaps multiple first dummy electrodes 55 in a portion in which the first dummy electrode pattern 51 and the second dummy electrode pattern 53 overlap each other.

Four second dummy electrodes 57 evenly overlap one first dummy electrode 55 (hatched with thick and thin lines) as shown in, for example, FIG. 7. The multiple dummy electrodes increase the uniformity of the pattern distribution in the plane and reduce pattern visibility.

More specifically, the first dummy electrode 55 hatched with thick and thin lines in FIG. 7 extends across the four second dummy electrodes 57. Gaps between the four second dummy electrodes 57 being a cross-shaped slit define a pattern of small squares.

(3-5) Portion in which First Electrode Pattern and Second Electrode Pattern Overlap Each Other in Second Embodiment The first electrode pattern 9 includes multiple first electrode slits 9a extending in an electrode extending direction (X-direction) in a portion in which the first electrode pattern 9 and the second electrode pattern 17 overlap each other, as shown in FIGS. 4 and 5. The multiple first electrode slits 9a are aligned in each portion in X-direction. The length of each first electrode slit 9a is half the length of one side of the first dummy electrode 55. The second electrode pattern 17 includes multiple second electrode slits 17a extending in an electrode extending direction (Y-direction). The multiple second electrode slits 17a are aligned in each portion in X-direction. The length of each second electrode slit 17a is the same as the length of one side of the second dummy electrode 57.

In a portion in which the first electrode pattern 9 and the second electrode pattern 17 overlap each other, as shown in the shaded portion in FIG. 7, a combination of the second electrode slit 17a (the first electrode 31 alone located as a conductive film) and the first electrode slit 9a (the second electrode 41 alone located as a conductive film) defines a cross-shaped slit. The first electrode slits 9a and the second electrode slits 17a increase the uniformity of the pattern distribution in the plane and reduce pattern visibility in portions in which the first electrode pattern 9 and the second electrode pattern 17 overlap each other. The touchscreen 1 includes the electrode patterns both including split electrodes. This structure thus effectively reduces pattern visibility using the first electrode pattern 9 on the first surface 3a of the substrate 3 and the second electrode pattern 17 on the second surface 3b of the substrate 3.

More specifically, in the shaded portion in FIG. 7, a combination of the first electrode slits 9a and the second electrode slits 17a define a pattern of small squares in the first split electrode 33c.

(3-6) Overall Pattern

The first electrode pattern 9, the second electrode pattern 17, the first electrode slits 9a, the second electrode slits 17a, the first dummy electrode patterns 51, the second dummy electrode patterns 53, the first slits 55a1, the second slits 55a2, and the third slits 57a1 form a pattern described below.

A portion in which the first electrode pattern 9 overlaps the second electrode pattern 17 or the second dummy electrode pattern 53 is split into multiple identical shapes defined by slit portions. The shapes are square as shown in FIGS. 6 and 7.

A portion in which the second electrode pattern 17 overlaps with the first electrode pattern 9 or the first dummy electrode patterns 51 is split into multiple identical shapes defined by slit portions. The shapes are square as shown in FIGS. 6 and 7.

As described above, in the overall view area of the touchscreen 1, the overall pattern is a uniform pattern of multiple identical shapes (squares), and thus is less visible from outside. This structure thus reduces pattern visibility.

The multiple identical shapes defined by the slit portions are squares under the conditions described below. The conditions below apply to other embodiments as well.

Each first dummy electrode 55 has a width x (length in Y-direction), where x is a width (length in Y-direction) of each of the multiple first split electrodes 33a, 33b, and 33c in the first electrode pattern 9. In other words, the widths are the same.

The distance between the first split electrodes 33a, 33b, and 33c in the first electrode pattern 9 (distance between the centers) is a sum of integer multiples of x and y, where y is the distance of the gap (length in Y-direction) between each of the first split electrodes 33a, 33b, and 33c and the first dummy electrodes 55 in the first electrode pattern 9 and is the distance of the gap (length in Y-direction) between the first dummy electrodes 55. In this embodiment, as shown in FIG. 4, the distance between the first split electrode 33a and the first split electrode 33b is 4x+4y. The distance between the first split electrode 33a and the first split electrode 33c is 8x+8y.

Each of the multiple second split electrodes 43a, 43b, and 43c in the second electrode pattern 17 has a width z (length in X-direction), where z is nx+(n−1)y (n is a positive integer). In this embodiment, z=2x+y, as shown in FIG. 5. In other words, in this embodiment, the width of each of the second split electrodes 43a, 43b and 43c is longer than the width of each of the first split electrodes 33a, 33b and 33c.

The width (length in X-direction) of each second dummy electrode 57 is x.

The distance between the second split electrodes 43a, 43b and 43c in the second electrode pattern 17 (distance between the centers) is a sum of integer multiples of x and y. In this embodiment, as shown in FIG. 5, the distance between the second split electrode 43a and the second split electrode 43b is 4x+4y, the distance between the second split electrode 43b and the second split electrode 43c is 4x+4y, and the distance between the second split electrode 43a and the second split electrode 43c is 8x+8y.

2. Second Embodiment

In the first embodiment, the first electrode in the first electrode pattern splits into three, and the second electrode in the second electrode pattern splits into three. The number of splits is not limitative and may be modified. Second to fourth embodiments as modifications will now be described.

Figure 8:
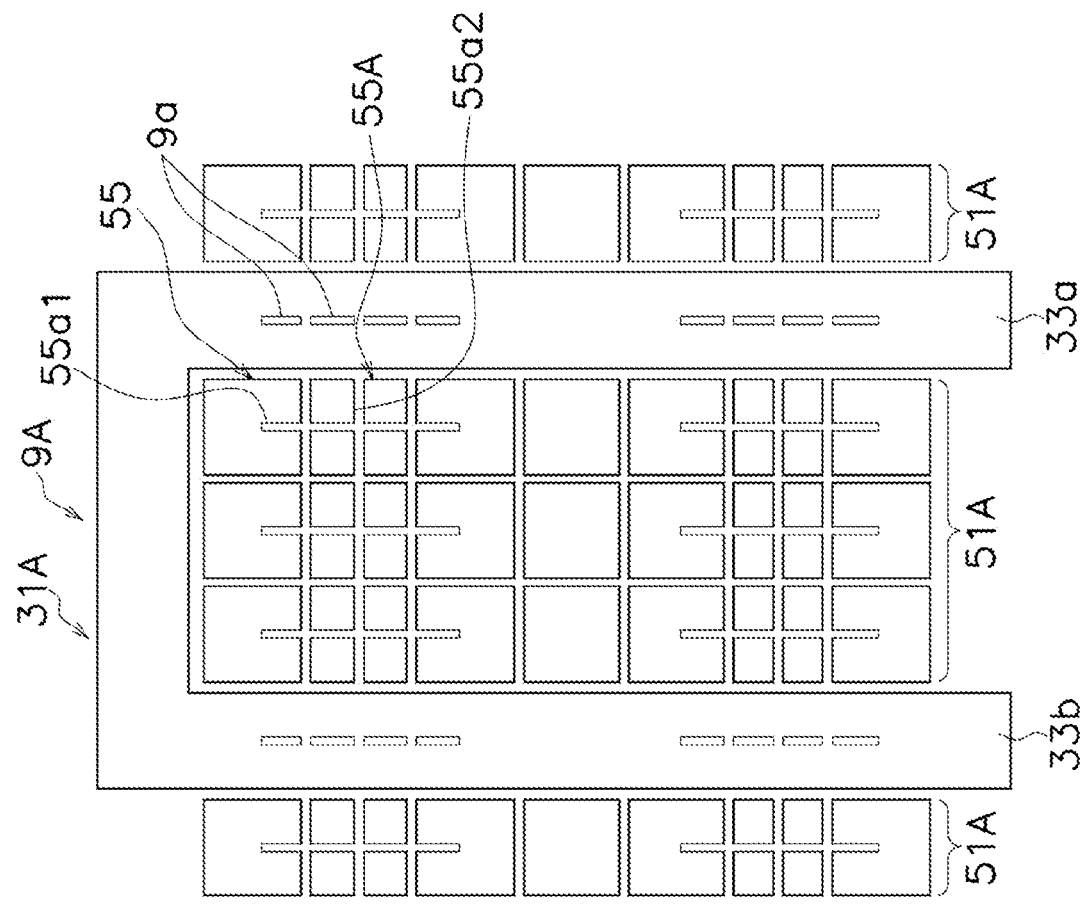
FIG. 8 is a schematic partial plan view of a first electrode pattern and first dummy electrode patterns in a second embodiment.
Figure 9:
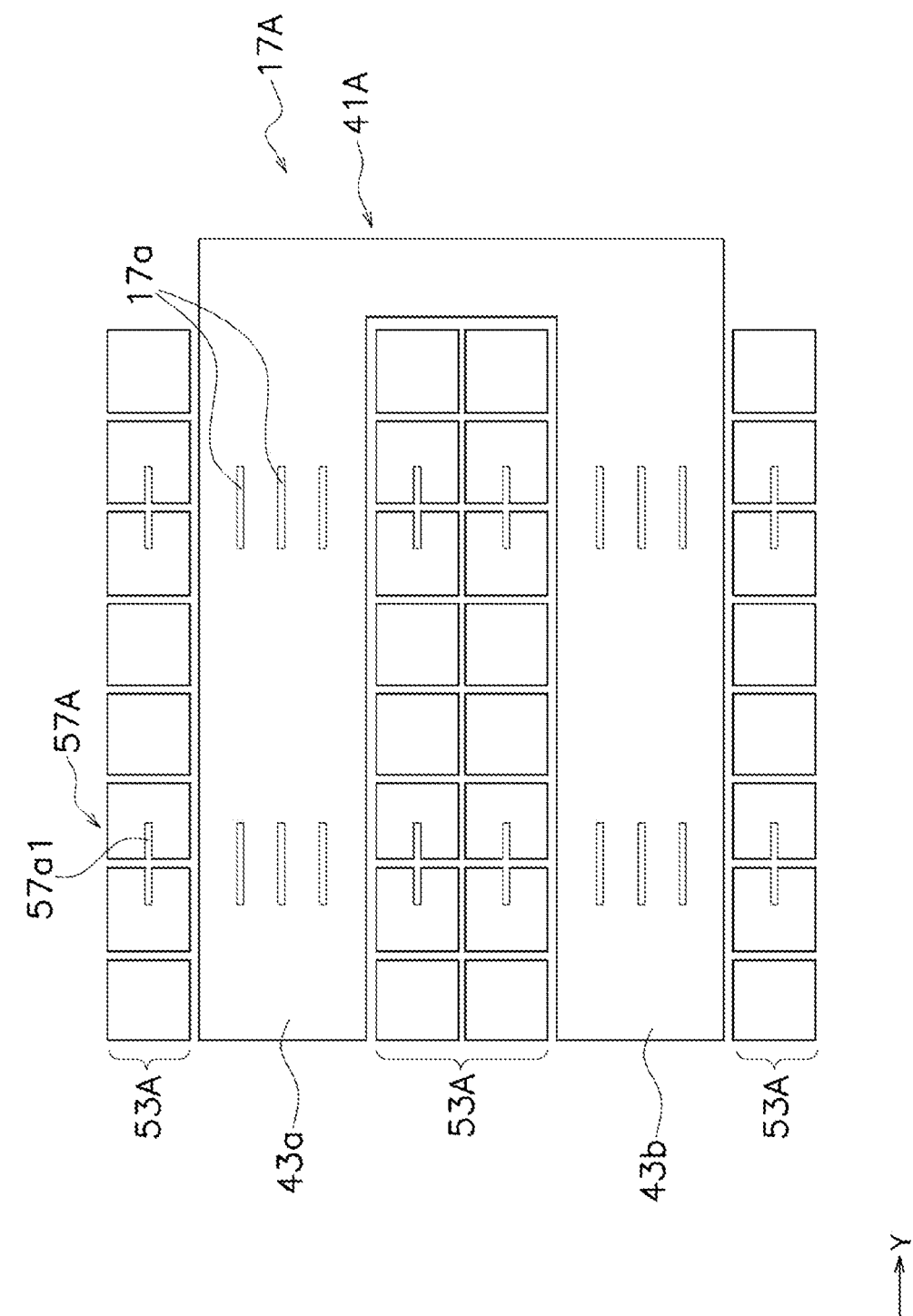
FIG. 9 is a schematic partial plan view of a second electrode pattern and second dummy electrode patterns.
Figure 10:
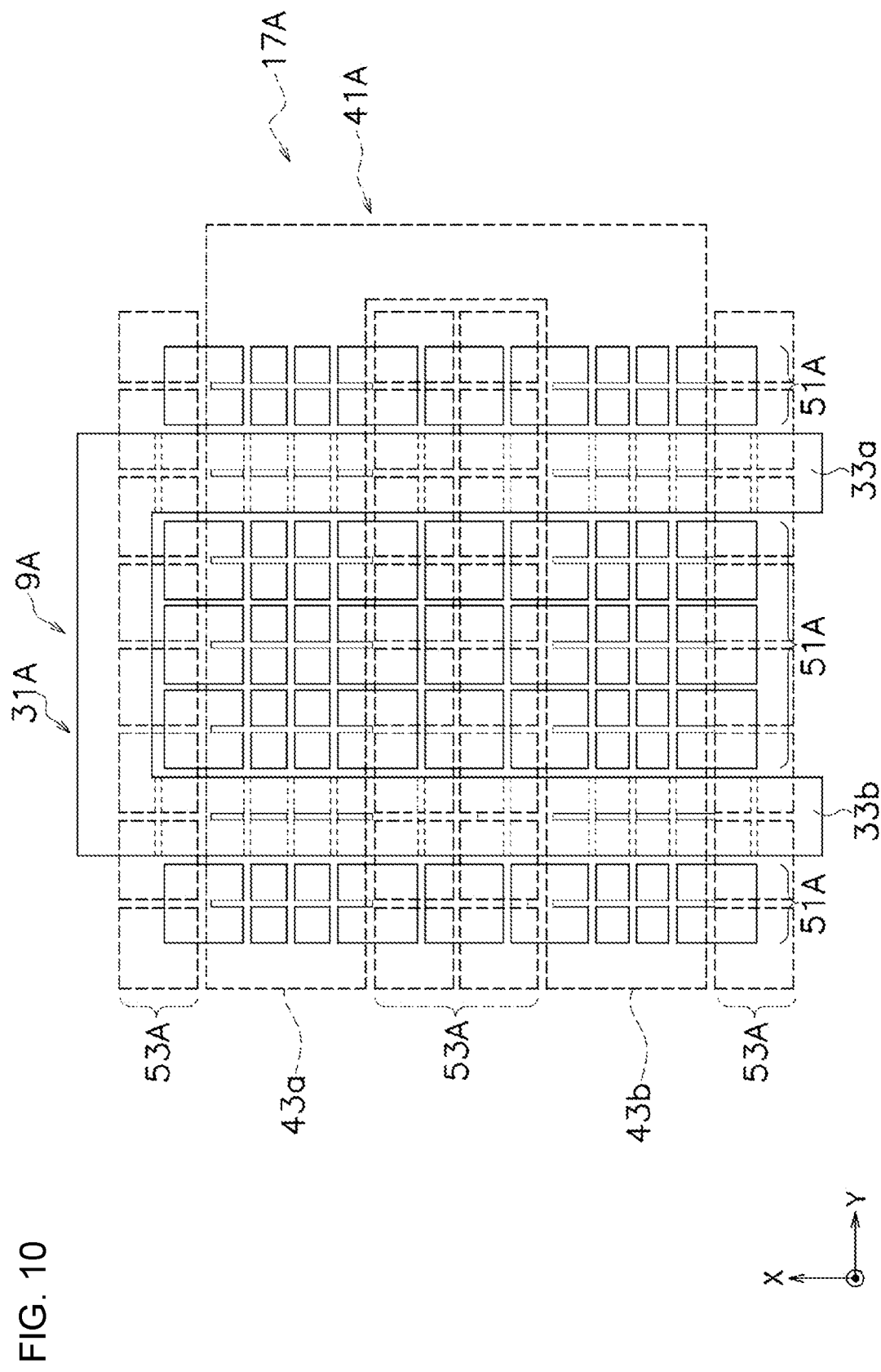
FIG. 10 is a schematic partial plan view of a touchscreen viewed from above, showing an overall pattern resulting from superimposing FIGS. 8 and 9.

The second embodiment will now be described with reference to FIGS. 8 to 10. FIG. 8 is a schematic partial plan view of a first electrode pattern and first dummy electrode patterns in the second embodiment. FIG. 9 is a schematic partial plan view of a second electrode pattern and second dummy electrode patterns. FIG. 10 is a schematic partial plan view of a touchscreen viewed from above, showing an overall pattern resulting from superimposing FIGS. 8 and 9.

Unlike in the first embodiment, a first electrode 31A splits into two, and a second electrode 41A splits into two.

In this embodiment, as shown in FIG. 8, a first electrode pattern 9A includes the first electrode slits 9a. First dummy electrodes 55A in each first dummy electrode pattern 51A include electrodes without slits, electrodes with the first slits 55a1, and electrodes with the second slits 55a2. A second electrode pattern 17A includes the second electrode slits 17a as shown in FIG. 9. Second dummy electrodes 57A in each second dummy electrode pattern 53A include electrodes without slits and electrodes with the third slits 57a1. As shown in FIG. 10, the overall pattern of the touchscreen is a uniform pattern of multiple identical shapes (squares) defined by slit portions as in the first embodiment. This structure thus reduces pattern visibility.

3. Third Embodiment

Figure 11:
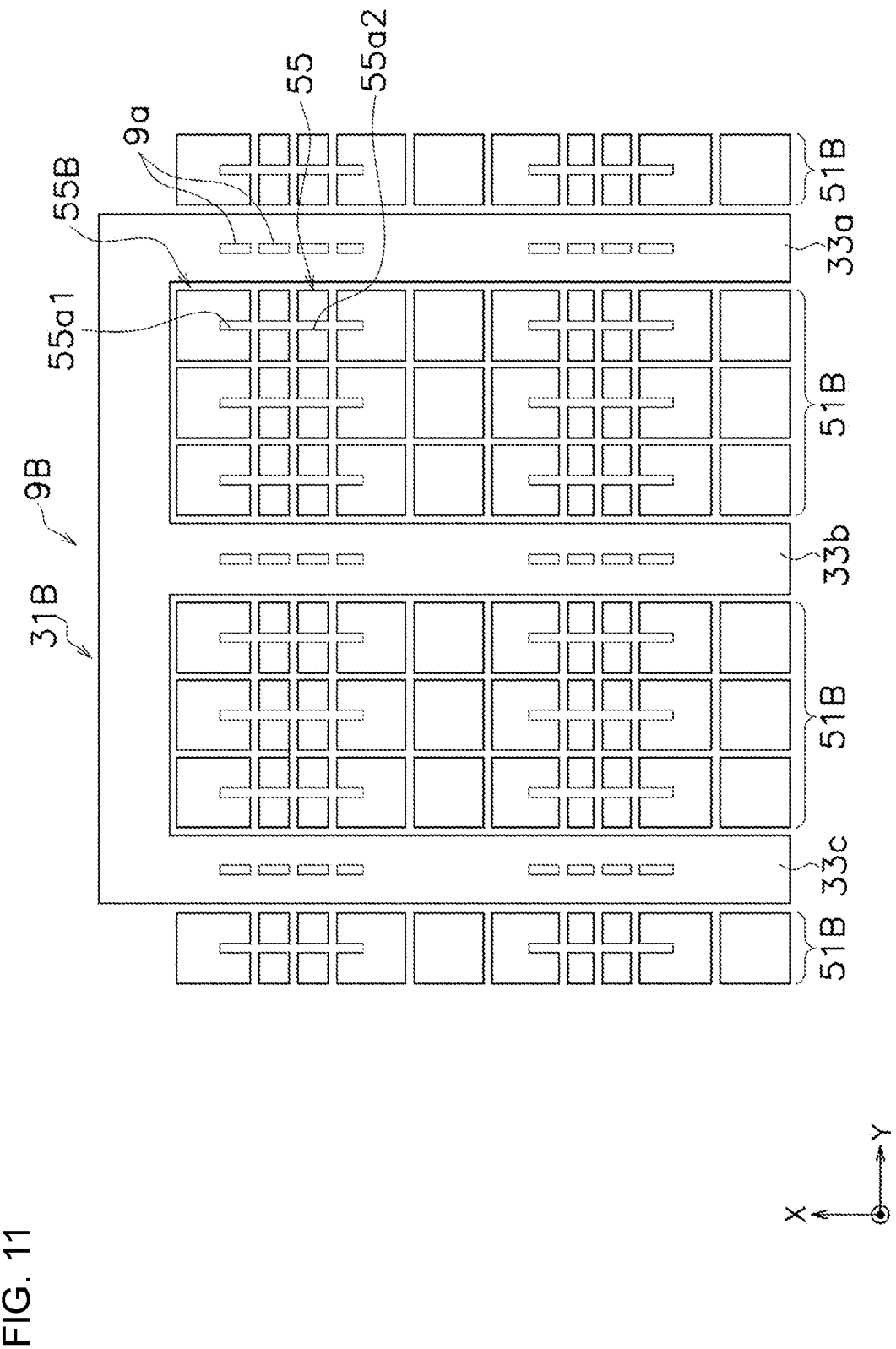
FIG. 11 is a schematic partial plan view of a first electrode pattern and first dummy electrode patterns in a third embodiment.
Figure 12:
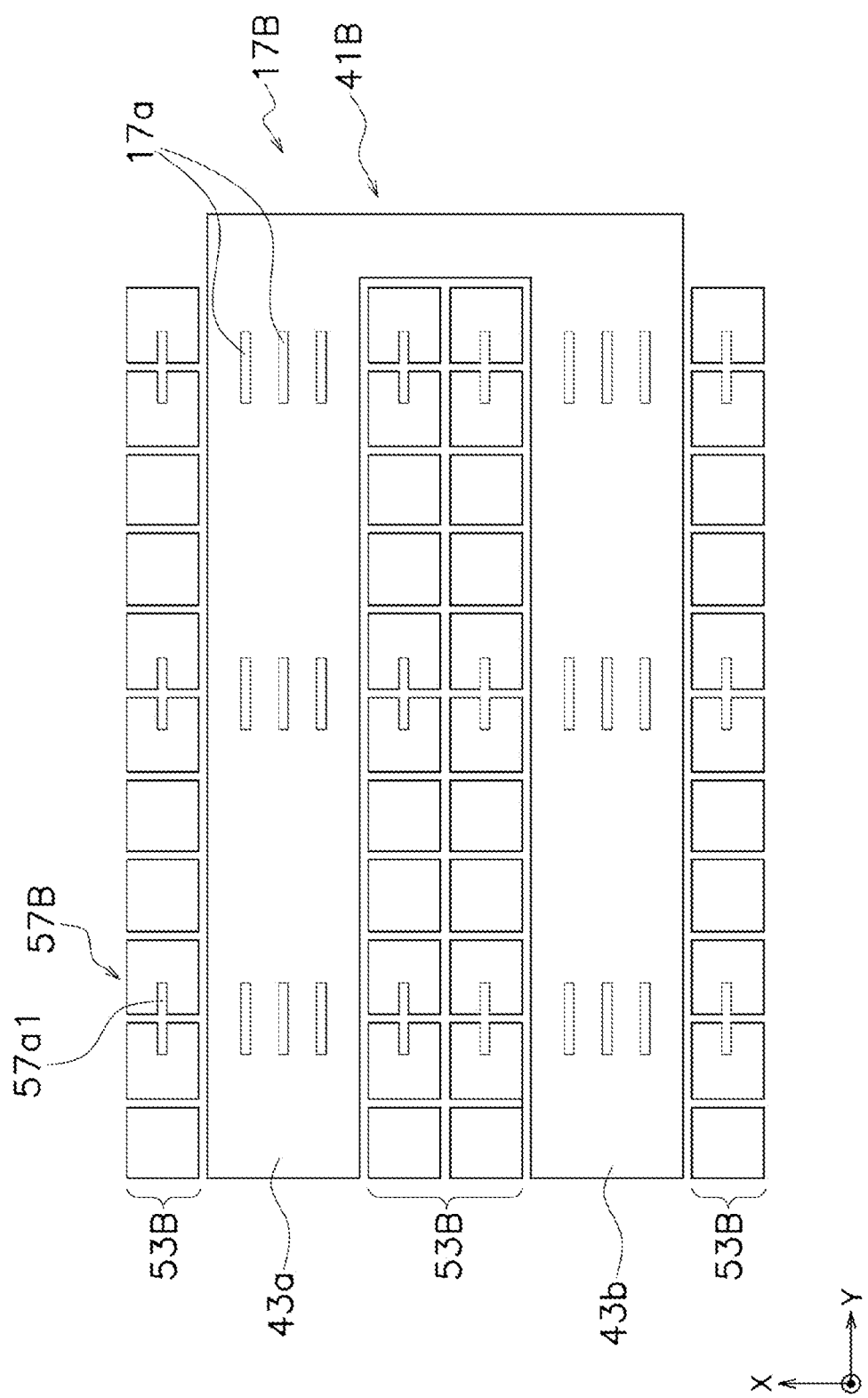
FIG. 12 is a schematic partial plan view of a second electrode pattern and second dummy electrode patterns.
Figure 13:
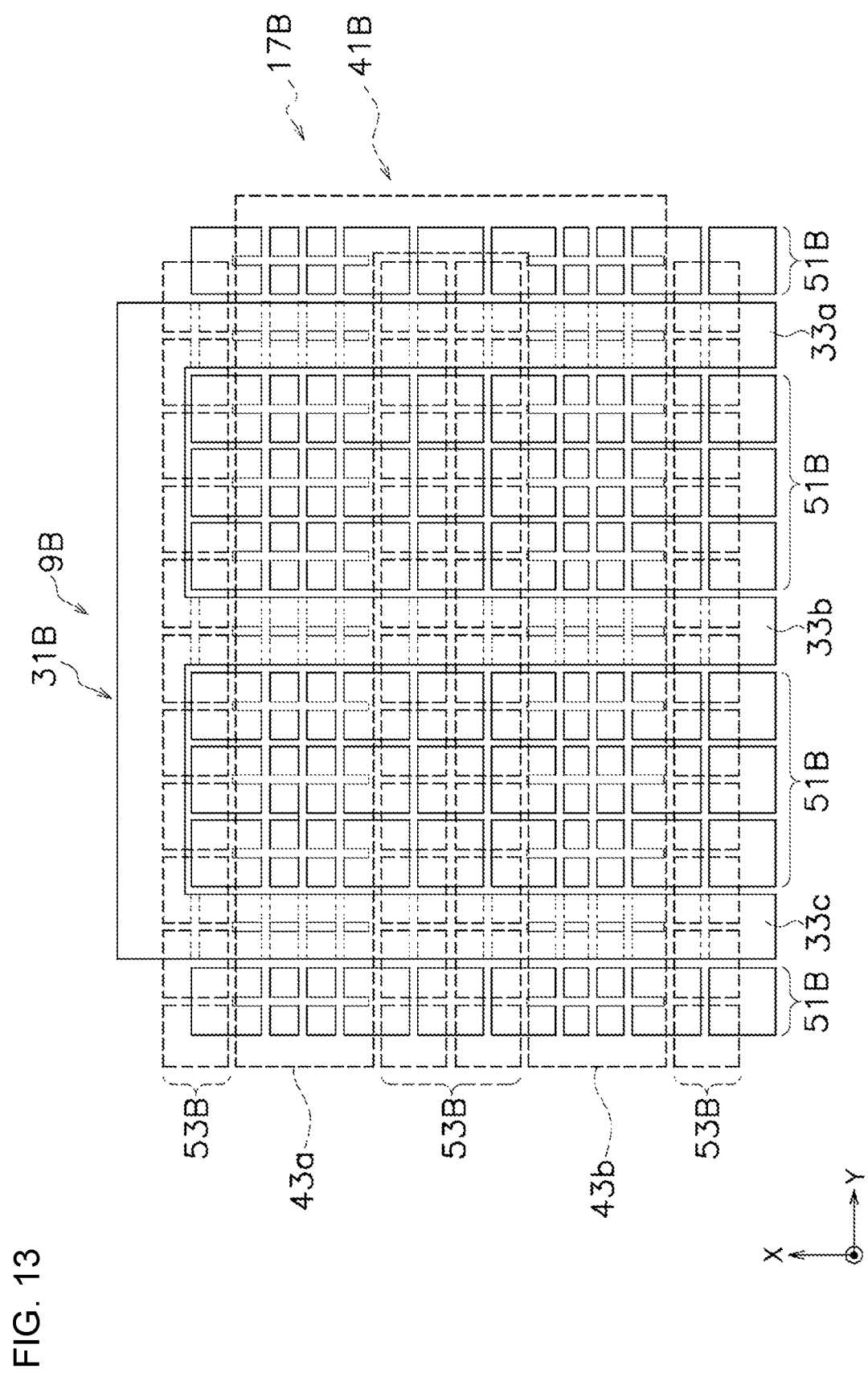
FIG. 13 is a schematic partial plan view of a touchscreen viewed from above, showing an overall pattern resulting from superimposing FIGS. 11 and 12.

The third embodiment will now be described with reference to FIGS. 11 to 13. FIG. 11 is a schematic partial plan view of a first electrode pattern and first dummy electrode patterns in the third embodiment. FIG. 12 is a schematic partial plan view of a second electrode pattern and second dummy electrode patterns. FIG. 13 is a schematic partial plan view of a touchscreen viewed from above, showing an overall pattern resulting from superimposing FIGS. 11 and 12.

Unlike in the first embodiment, a first electrode 31B splits into three, and a second electrode 41B splits into two.

In this embodiment, as shown in FIG. 11, a first electrode pattern 9B includes the first electrode slits 9a. First dummy electrodes 55B in each first dummy electrode pattern 51B include electrodes without slits, electrodes with the first slits 55a1, and electrodes with the second slits 55a2. A second electrode pattern 17B includes the second electrode slits 17a as shown in FIG. 12. Second dummy electrodes 57B in each second dummy electrode pattern 53B include electrodes without slits and electrodes with the third slits 57a1. As shown in FIG. 13, the overall pattern of the touchscreen is a uniform pattern of multiple identical shapes (squares) defined by slit portions as in the first embodiment. This structure thus reduces pattern visibility.

4. Fourth Embodiment

Figure 14:
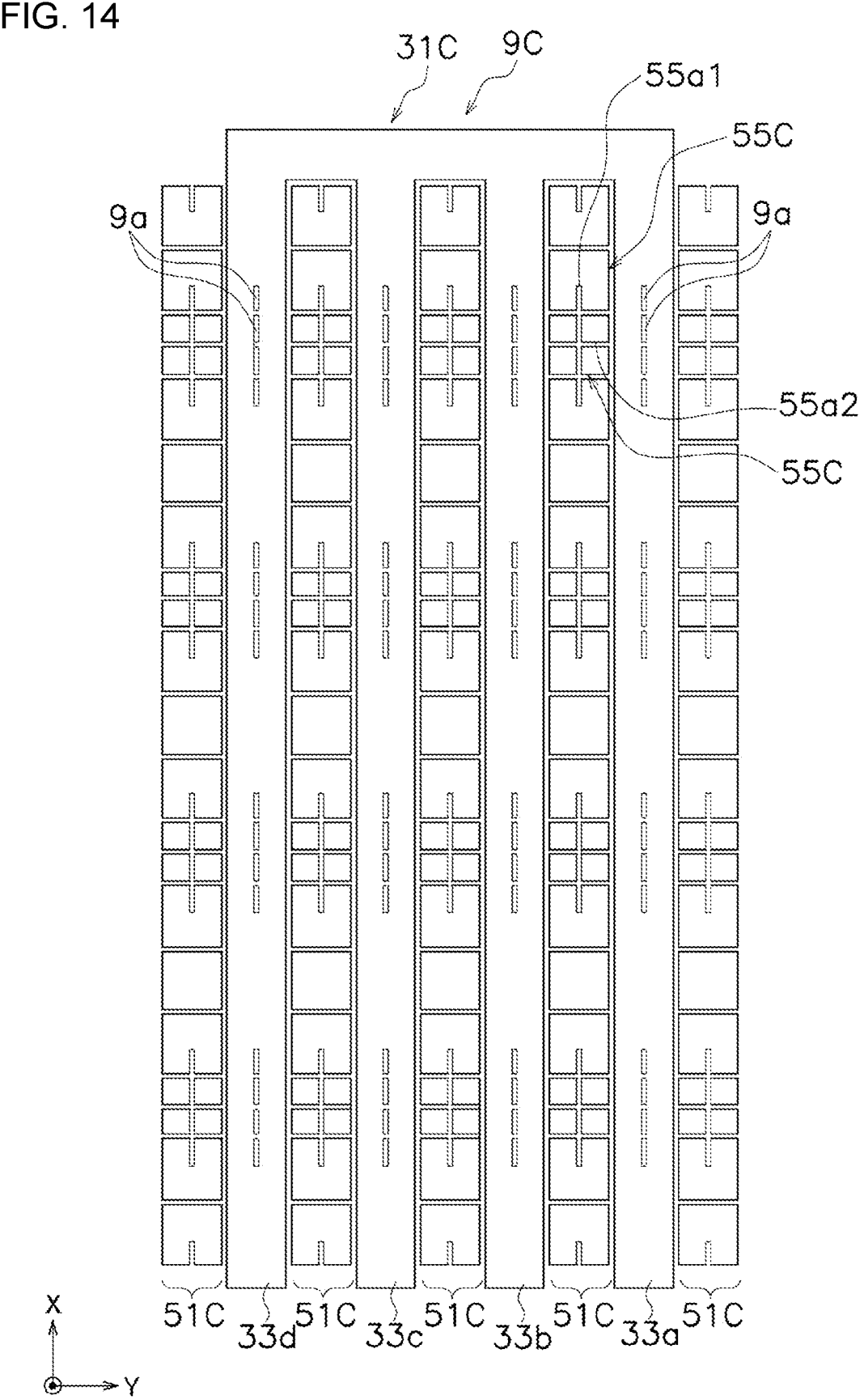
FIG. 14 is a schematic partial plan view of a first electrode pattern and first dummy electrode patterns in a fourth embodiment.
Figure 15:
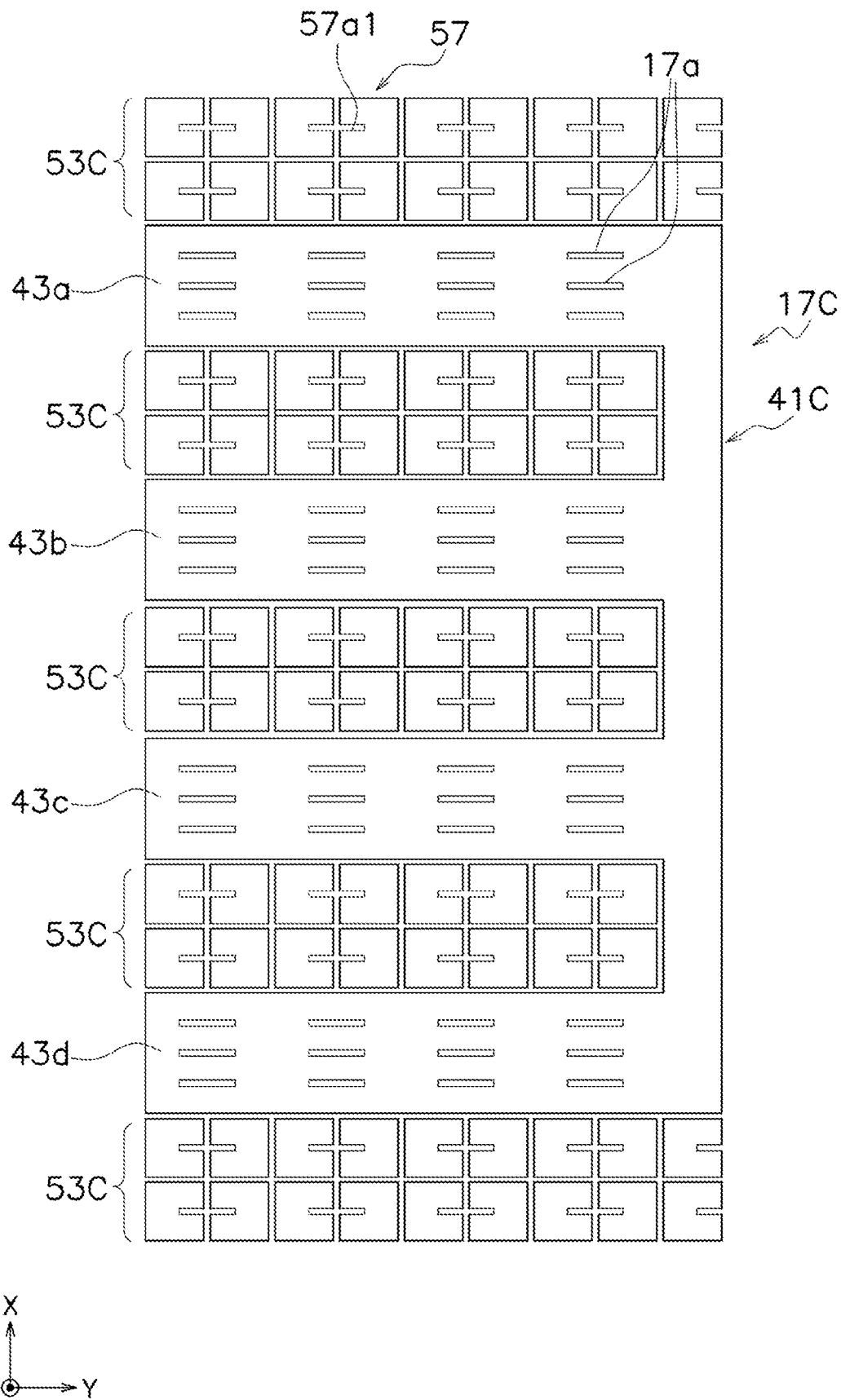
FIG. 15 is a schematic partial plan view of a second electrode pattern and second dummy electrode patterns.
Figure 16:
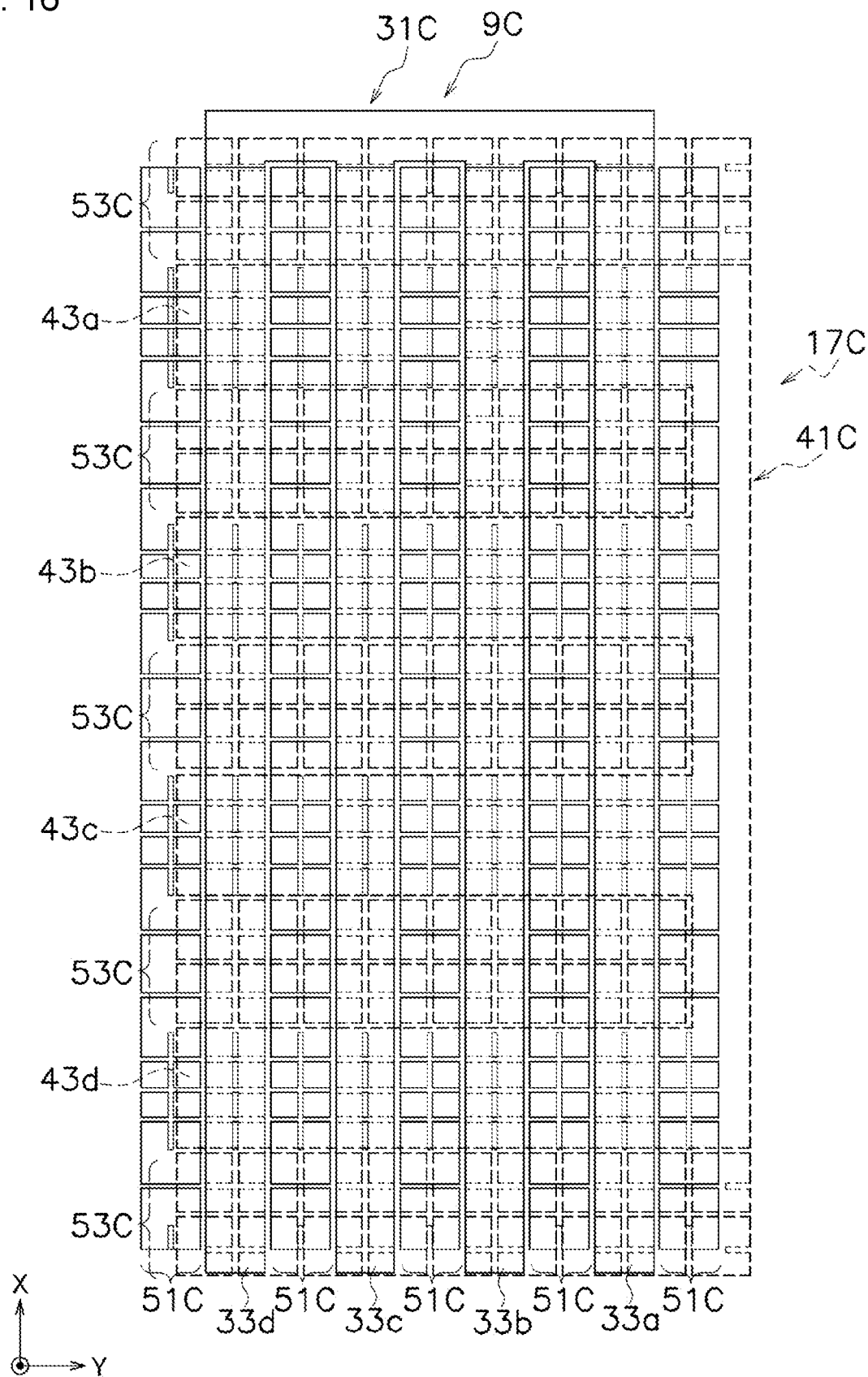
FIG. 16 is a schematic partial plan view of a touchscreen viewed from above, showing an overall pattern resulting from superimposing FIGS. 14 and 15.

The third embodiment will now be described with reference to FIGS. 14 to 16. FIG. 14 is a schematic partial plan view of a first electrode pattern and first dummy electrode patterns in the fourth embodiment. FIG. 15 is a schematic partial plan view of a second electrode pattern and second dummy electrode patterns. FIG. 16 is a schematic partial plan view of a touchscreen viewed from above, showing an overall pattern resulting from superimposing FIGS. 14 and 15.

Unlike in the first embodiment, a first electrode 31C splits into four, and a second electrode 41C splits into four.

In this embodiment, as shown in FIG. 14, a first electrode pattern 9C includes the first electrode slits 9a. First dummy electrodes 55C in each first dummy electrode pattern 51C include electrodes without slits, electrodes with the first slits 55a1, and electrodes with the second slits 55a2. As shown in FIG. 15, a second electrode pattern 17C includes the second electrode slits 17a. Second dummy electrodes 57C in each second dummy electrode pattern 53C include the third slits 57a1. As shown in FIG. 16, the overall pattern of the touchscreen is a uniform pattern of multiple identical shapes (squares) defined by slit portions as in the first embodiment. This structure thus reduces pattern visibility.

5. Fifth Embodiment

Although the width of the first electrode in the first electrode pattern is shorter than the width of the second electrode in the second electrode pattern in the first embodiment, the widths may be the same.

Figure 17:
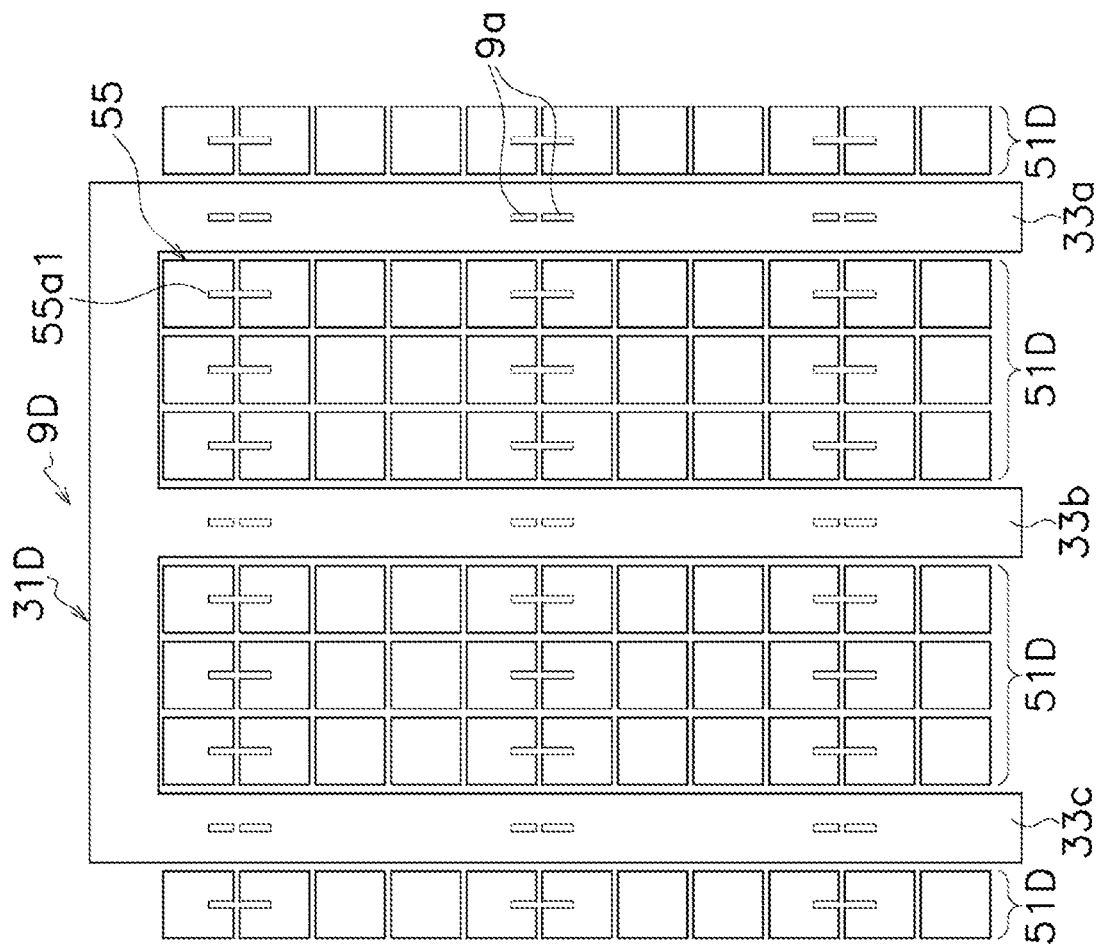
FIG. 17 is a schematic partial plan view of a first electrode pattern and first dummy electrode patterns in a fifth embodiment.
Figure 18:
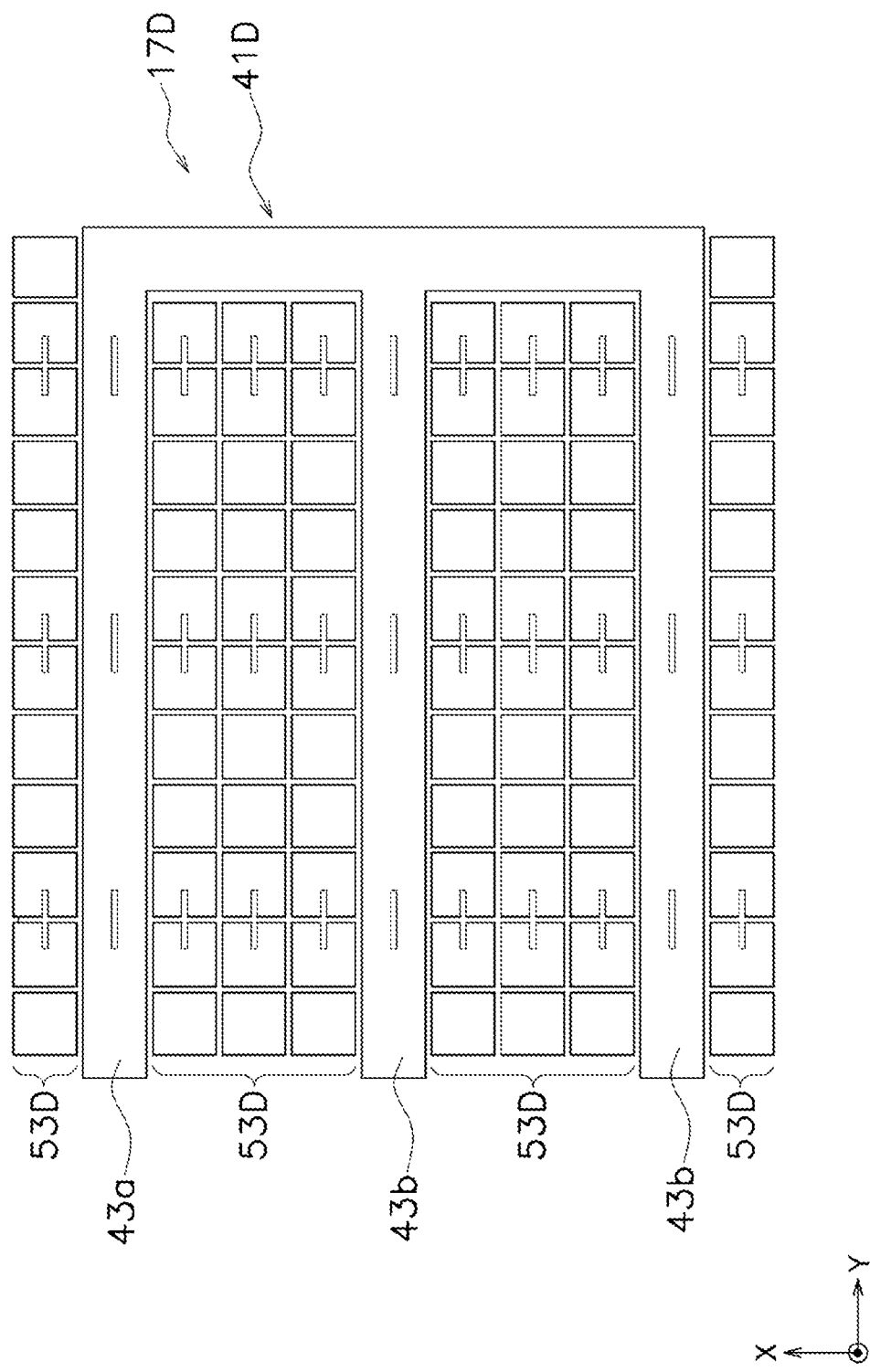
FIG. 18 is a schematic partial plan view of a second electrode pattern and second dummy electrode patterns.
Figure 19:
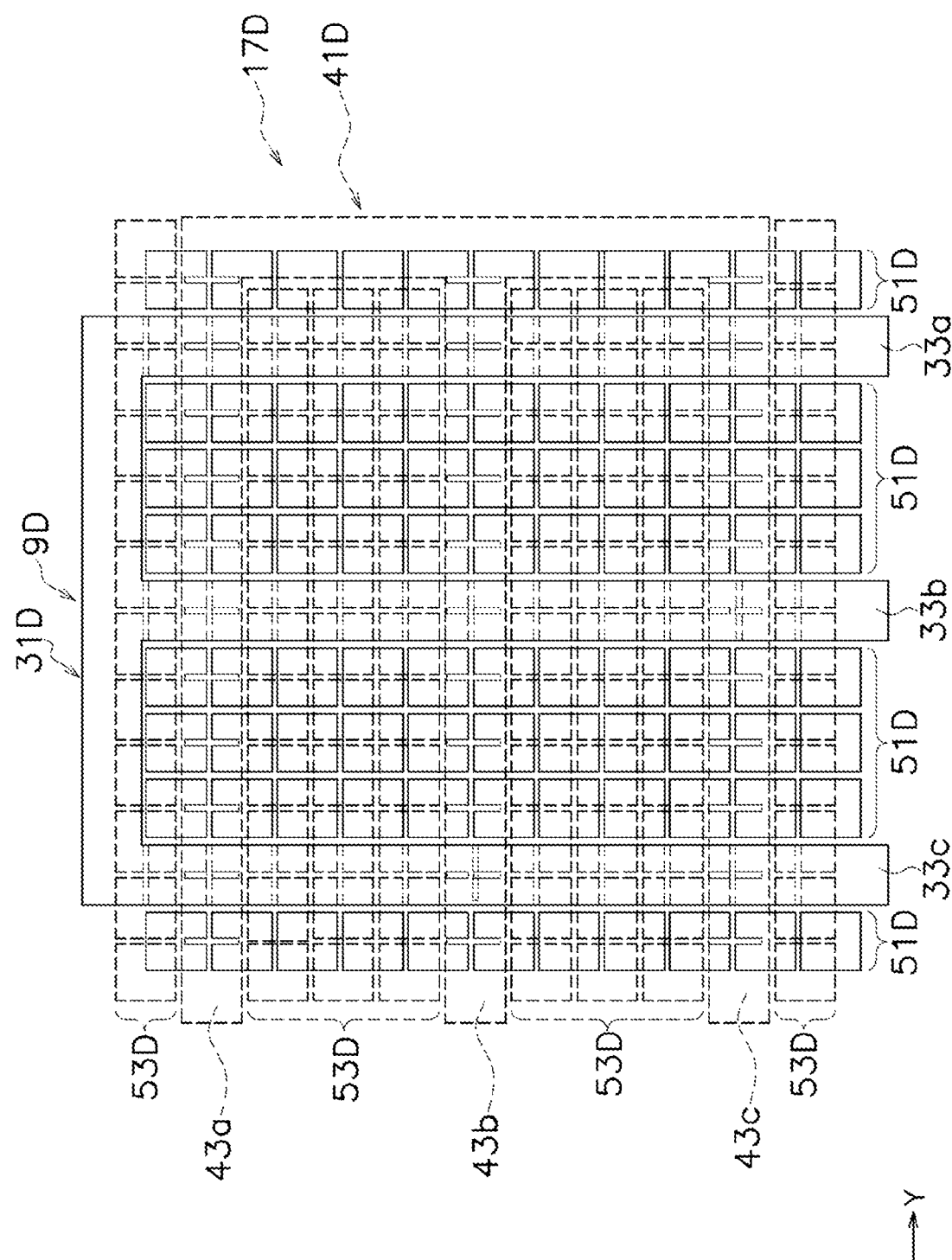
FIG. 19 is a schematic partial plan view of a touchscreen viewed from above, showing an overall pattern resulting from superimposing FIGS. 17 and 18.

A fifth embodiment as such a modification will now be described with reference to FIGS. 17 to 19. FIG. 17 is a schematic partial plan view of a first electrode pattern and first dummy electrode patterns in the fifth embodiment. FIG. 18 is a schematic partial plan view of a second electrode pattern and second dummy electrode patterns. FIG. 19 is a schematic partial plan view of a touchscreen viewed from above, showing an overall pattern resulting from superimposing FIGS. 17 and 18.

As in the first embodiment, a first electrode 31D splits into three, and a second electrode 41D splits into three.

Unlike in the first embodiment, the width in each of the second split electrodes 43a, 43b, and 43c of a second electrode pattern 17D is the same as the width of each of the first split electrodes 33a, 33b, and 33c in a first electrode pattern 9D.

In this embodiment, as shown in FIG. 17, the first electrode pattern 9D includes the first electrode slits 9a. First dummy electrodes 55D in each first dummy electrode pattern 51D include electrodes without slits and electrodes with the first slits 55a1. As shown in FIG. 18, the second electrode pattern 17D includes the second electrode slits 17a. Second dummy electrodes 57D in each second dummy electrode pattern 53D include electrodes without slits and electrodes with the third slits 57a1. As shown in FIG. 19, the overall pattern of the touchscreen is a uniform pattern of multiple identical shapes (squares) defined by slit portions as in the first embodiment. This structure thus reduces pattern visibility.

6. Sixth Embodiment

The first electrode pattern and the first dummy electrode patterns are on a different layer from the second electrode pattern and the second electrode pattern with an insulating layer in between. Multiple modifications are allowed.

For example, in the first to third embodiments, a touchscreen with each electrode pattern on two respective substrates is described. The present invention is also applicable to a touchscreen with each electrode pattern on both sides of one substrate.

7. Seventh Embodiment

The multilayer structure of the touchscreen is not limited to the first embodiment. The multilayer structures of the touchscreen in modifications will now be described using seventh to ninth embodiments. The first and second dummy electrodes are not described in the seventh to ninth embodiments. The same first and second dummy electrode patterns as in the first to sixth embodiments are included to produce the same effects.

Figure 20:
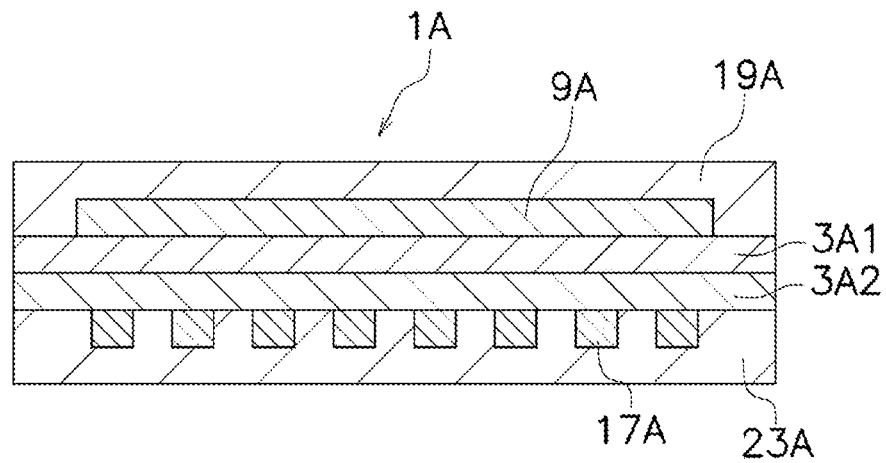
FIG. 20 is a schematic cross-sectional view of a touchscreen according to a sixth embodiment.

A touchscreen 1A according to the seventh embodiment will now be described with reference to FIG. 20. FIG. 20 is a schematic cross-sectional view of the touchscreen according to the seventh embodiment.

The touchscreen 1A includes a first substrate 3A1 and a second substrate 3A2 that are bonded together as transparent insulating substrates.

The touchscreen 1A includes the first electrode pattern 9A. The first electrode pattern 9A is on a surface of the first substrate 3A1 opposite to the second substrate 3A2.

The touchscreen 1A includes the second electrode pattern 17A. The second electrode pattern 17A is on a surface of the second substrate 3A2 opposite to the first substrate 3A1.

The first electrode pattern 9A, a first protective layer 19A, and the first routing wires (not shown) are on the first substrate 3A1. The second electrode pattern 17A, a second protective layer 23A, and the second routing wires (not shown) are on the second substrate 3A2.

8. Eighth Embodiment

Figure 21:
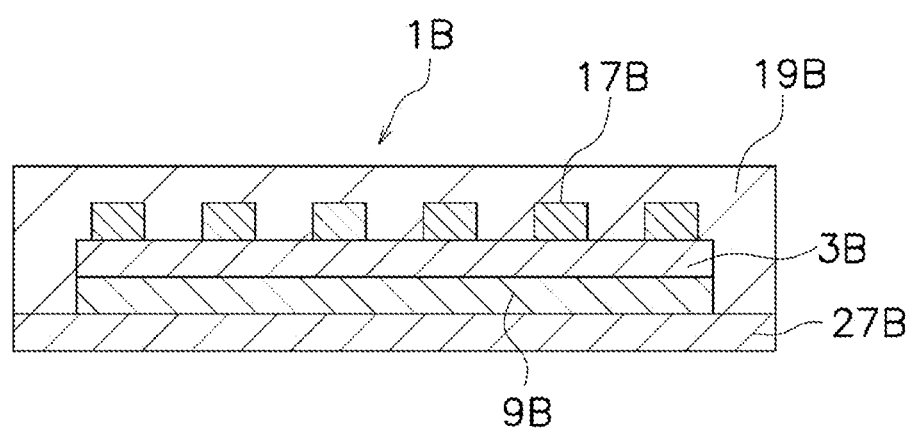
FIG. 21 is a schematic cross-sectional view of a touchscreen according to a seventh embodiment.

A touchscreen 1B according to the eighth embodiment will now be described with reference to FIG. 21. FIG. 21 is a schematic cross-sectional view of the touchscreen according to the eighth embodiment.

The touchscreen 1B includes a sheet 27B.

The touchscreen 1B includes a resin layer 3B that is coated as a transparent insulating substrate. The resin layer 3B is on an upper surface of the sheet 27B.

The touchscreen 1B includes the first electrode pattern 9B. The first electrode pattern 9A is on a surface of the resin layer 3B facing the sheet 27B.

The touchscreen 1B includes the second electrode pattern 17B. The second electrode pattern 17B is on a surface of the resin layer 3B opposite to the sheet 27B.

A protective layer 19B that covers the first electrode pattern 9B, an insulating layer 11B, and the second electrode pattern 17B is on the sheet 27B.

9. Ninth Embodiment

Figure 22:
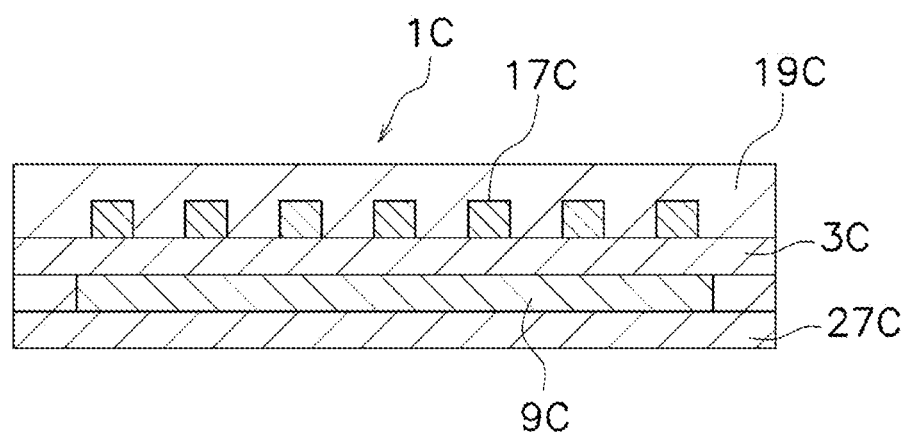
FIG. 22 is a schematic cross-sectional view of a touchscreen according to an eighth embodiment.

A touchscreen 1C according to the ninth embodiment will now be described with reference to FIG. 22. FIG. 22 is a schematic cross-sectional view of the touchscreen according to the ninth embodiment.

The touchscreen 1C includes a sheet 27C.

The touchscreen 1C includes a resin film 3C as a transparent insulating substrate. The resin film 3C is on an upper surface of the sheet 27C.

The touchscreen 1C includes the first electrode pattern 9C. The first electrode pattern 9C is on a surface the resin film 3C facing the sheet 27C.

The touchscreen 1C includes the second electrode pattern 17C. The second electrode pattern 17C is on a surface of the resin film 3C opposite to the sheet 27C.

A protective layer 19C that covers the second electrode pattern 17C is on the resin film 3C.

10. Other Embodiments

Although the multiple embodiments of the present invention have been described, the present invention is not limited to the embodiments above, and may be changed in various manners without departing from the spirit and scope of the present invention. The embodiments and modifications described herein may be combined in any manner as appropriate.

The split electrodes are not limited to strip electrodes.

The shapes of the dummy electrodes are not limited to being square. For example, the dummy electrodes may have disconnected or zigzag sides.

The shapes of the slits are not limited to being linear. For example, the slits may have disconnected or zigzag shapes.

INDUSTRIAL APPLICABILITY

The present invention is widely applicable to capacitive touchscreens.

REFERENCE SIGNS LIST 1 touchscreen
3 substrate
9 first electrode pattern
9a first electrode slit
17 second electrode pattern
17a second electrode slit
31 first electrode
41 second electrode
51 first dummy electrode pattern
53 second dummy electrode pattern
55 first dummy electrode
55a1 first slit
55a2 second slit
57 second dummy electrode
57a1 third slit

The invention claimed is:

1. A capacitive touchscreen, comprising:
a transparent insulating substrate;
a first electrode pattern on a first surface of the transparent insulating substrate, the first electrode pattern including a plurality of first split electrodes;
a first dummy electrode pattern in an area with no first electrode pattern on the first surface of the transparent insulating substrate, the first dummy electrode pattern including a plurality of first dummy electrodes;
a second electrode pattern on a second surface of the transparent insulating substrate, the second electrode pattern including a plurality of second split electrodes; and
a second dummy electrode pattern in an area with no second electrode pattern on the second surface of the transparent insulating substrate, the second dummy electrode pattern including a plurality of second dummy electrodes,
wherein at least one first dummy electrode of the plurality of first dummy electrodes includes a slit,
wherein at least one second dummy electrode of the plurality of second dummy electrodes includes a slit,
wherein the first electrode pattern and the second electrode pattern include a plurality of electrode slits extending in an electrode extending direction in a portion in which the first electrode pattern and the second electrode pattern overlap each other, and
the first electrode pattern, the second electrode pattern, the plurality of electrode slits, the first dummy electrode pattern, the second dummy electrode pattern, and the slit of the at least one first dummy electrode or the slit of the at least one second dummy electrode are configured to split a portion in which the first electrode pattern overlaps the second electrode pattern or the second dummy electrode pattern and a portion in which the second electrode pattern overlaps the first electrode pattern or the first dummy electrode pattern into a plurality of identical shapes defined by slit portions.

2. The capacitive touchscreen according to claim 1, wherein
the slit of the first dummy electrode extends inward from an outer edge of the at least one first dummy electrode in a portion in which the at least one first dummy electrode partially overlaps the second electrode pattern.

3. The capacitive touchscreen according to claim 1, wherein
the slit of the first dummy electrode splits the at least one first dummy electrode into a plurality of parts in a portion in which the first dummy electrode pattern fully overlaps the second electrode pattern.

4. The capacitive touchscreen according to claim 1, wherein
one of the plurality of first dummy electrodes overlaps second dummy electrodes of the plurality of second dummy electrodes or one of the plurality of second dummy electrodes overlaps first dummy electrodes of the plurality of first dummy electrodes in a portion in which the plurality of first dummy electrodes and the plurality of second dummy electrodes overlap each other.

5. The capacitive touchscreen according to claim 1, wherein
each of the plurality of first dummy electrodes has a width x, where x is a width of each of the plurality of first split electrodes in the first electrode pattern,
a distance between the plurality of first split electrodes in the first electrode pattern is a sum of integer multiples of x and y, where y is a width of a gap between a first split electrode of the plurality of first split electrodes in the first electrode pattern and a first dummy electrode of the plurality of first dummy electrodes and a width of a gap between the plurality of first dummy electrodes,
each of the plurality of second split electrodes in the second electrode pattern has a width z, where z is nx+(n−1)y, where n is a positive integer,
each of the plurality of second dummy electrodes has the width x, and
a distance between the plurality of second split electrodes in the second electrode pattern is a sum of integer multiples of x and y, and the plurality of identical shapes defined by the slit portions are square.

6. The capacitive touchscreen according to claim 1, wherein
the slit of the second dummy electrode extends inward from an outer edge of the at least one second dummy electrode in a portion in which the at least one second dummy electrode partially overlaps the first electrode pattern.

7. The capacitive touchscreen according to claim 1, wherein
the slit of the second dummy electrode splits the at least one second dummy electrode into a plurality of parts in a portion in which the second dummy electrode pattern fully overlaps the first electrode pattern.

8. The capacitive touchscreen according to claim 1, wherein
the transparent insulating substrate includes a first substrate having the first surface and a second substrate having the second surface, and
wherein the first electrode pattern is on the first surface of the first substrate and the second electrode pattern is on the second surface of the second substrate.

9. The capacitive touchscreen according to claim 1, further comprising a sheet, wherein the first surface of the transparent insulating substrate having the first electrode pattern faces the sheet.

10. The capacitive touchscreen according to claim 9, wherein the transparent insulating substrate is a resin layer.

11. The capacitive touchscreen according to claim 9, wherein the transparent insulating substrate is a resin film.

12. A capacitive touchscreen, comprising:
a transparent insulating substrate;
a first electrode pattern on a first surface of the transparent insulating substrate, the first electrode pattern including a plurality of first split electrodes;
a first dummy electrode pattern in an area with no first electrode pattern on the first surface of the transparent insulating substrate, the first dummy electrode pattern including a plurality of first dummy electrodes;
a second electrode pattern on a second surface of the transparent insulating substrate, the second electrode pattern including a plurality of second split electrodes; and
a second dummy electrode pattern in an area with no second electrode pattern on the second surface of the transparent insulating substrate, the second dummy electrode pattern including a plurality of second dummy electrodes,
wherein at least one first dummy electrode of the plurality of first dummy electrodes includes a slit,
wherein the first electrode pattern and the second electrode pattern include a plurality of electrode slits extending in an electrode extending direction in a portion in which the first electrode pattern and the second electrode pattern overlap each other, and
the first electrode pattern, the second electrode pattern, the plurality of electrode slits, the first dummy electrode pattern, the second dummy electrode pattern, and the slit of the at least one first dummy electrode are configured to split a portion in which the first electrode pattern overlaps the second electrode pattern or the second dummy electrode pattern and a portion in which the second electrode pattern overlaps the first electrode pattern or the first dummy electrode pattern into a plurality of identical shapes defined by slit portions.

13. The capacitive touchscreen according to claim 12, wherein
the slit of the first dummy electrode extends inward from an outer edge of the at least one first dummy electrode in a portion in which the at least one first dummy electrode partially overlaps the second electrode pattern.

14. The capacitive touchscreen according to claim 12, wherein
the slit of the first dummy electrode splits the at least one first dummy electrode into a plurality of parts in a portion in which the first dummy electrode pattern fully overlaps the second electrode pattern.

15. The capacitive touchscreen according to claim 12, wherein
one of the plurality of first dummy electrodes overlaps second dummy electrodes of the plurality of second dummy electrodes or one of the plurality of second dummy electrodes overlaps first dummy electrodes of the plurality of first dummy electrodes in a portion in which the plurality of first dummy electrodes and the plurality of second dummy electrodes overlap each other.

16. A capacitive touchscreen, comprising:
a transparent insulating substrate;
a first electrode pattern on a first surface of the transparent insulating substrate, the first electrode pattern including a plurality of first split electrodes;
a first dummy electrode pattern in an area with no first electrode pattern on the first surface of the transparent insulating substrate, the first dummy electrode pattern including a plurality of first dummy electrodes;
a second electrode pattern on a second surface of the transparent insulating substrate, the second electrode pattern including a plurality of second split electrodes; and
a second dummy electrode pattern in an area with no second electrode pattern on the second surface of the transparent insulating substrate, the second dummy electrode pattern including a plurality of second dummy electrodes,
wherein at least one second dummy electrode of the plurality of second dummy electrodes includes a slit,
wherein the first electrode pattern and the second electrode pattern include a plurality of electrode slits extending in an electrode extending direction in a portion in which the first electrode pattern and the second electrode pattern overlap each other, and
the first electrode pattern, the second electrode pattern, the plurality of electrode slits, the first dummy electrode pattern, the second dummy electrode pattern, and the slit of of the at least one second dummy electrode are configured to split a portion in which the first electrode pattern overlaps the second electrode pattern or the second dummy electrode pattern and a portion in which the second electrode pattern overlaps the first electrode pattern or the first dummy electrode pattern into a plurality of identical shapes defined by slit portions.

17. The capacitive touchscreen according to claim 16, wherein
the slit of the second dummy electrode extends inward from an outer edge of the at least one second dummy electrode in a portion in which the at least one second dummy electrode partially overlaps the first electrode pattern.

18. The capacitive touchscreen according to claim 16, wherein
the slit of the second dummy electrode splits the at least one second dummy electrode into a plurality of parts in a portion in which the second dummy electrode pattern fully overlaps the first electrode pattern.

19. The capacitive touchscreen according to claim 16, wherein
one of the plurality of first dummy electrodes overlaps second dummy electrodes of the plurality of second dummy electrodes or one of the plurality of second dummy electrodes overlaps first dummy electrodes of the plurality of first dummy electrodes in a portion in which the plurality of first dummy electrodes and the plurality of second dummy electrodes overlap each other.

* * * * *